United States Patent [19]
Iwamoto et al.

[11] Patent Number: 5,787,083
[45] Date of Patent: Jul. 28, 1998

[54] PATH SETTING SYSTEM FOR BROADCAST SERVICE IN SWITCHING NETWORK

[75] Inventors: Norihisa Iwamoto; Hiroyuki Watanabe, both of Tokyo, Japan

[73] Assignee: NEC Corporation, Japan

[21] Appl. No.: 626,179

[22] Filed: Mar. 29, 1996

[51] Int. Cl.$^6$ .................................. H04L 12/18
[52] U.S. Cl. .................. 370/389; 370/392; 370/400
[58] Field of Search .................. 370/312, 389, 370/390, 396, 400, 408, 410, 431, 432, 351, 392, 393

[56] References Cited

U.S. PATENT DOCUMENTS

| | | | |
|---|---|---|---|
| 4,740,954 | 4/1988 | Cotton et al. | 370/432 |
| 4,939,721 | 7/1990 | De Bosio | 370/392 |
| 5,321,694 | 6/1994 | Chang et al. | 370/235 |
| 5,347,272 | 9/1994 | Ota | 370/392 |
| 5,383,187 | 1/1995 | Vardakas et al. | 370/473 |
| 5,444,693 | 8/1995 | Arslan et al. | 370/221 |
| 5,539,745 | 7/1996 | Chang et al. | 370/235 |
| 5,546,388 | 8/1996 | Lin | 370/389 |

FOREIGN PATENT DOCUMENTS 62-179243  8/1987  Japan.

*Primary Examiner*—Benedict V. Safourek
*Assistant Examiner*—Seema S. Rao
*Attorney, Agent, or Firm*—Ostrolenk, Faber, Gerb & Soffen, LLP

[57] ABSTRACT

In a switching network through which a path between a source terminal and each of destination terminals is formed, a set of destination addresses is generated at the source terminal, and each of the destination addresses is transmitted from the source terminal to a destination switch node accommodating the destination terminal. Each switch node on the path receives a first set of destination addresses from a previous switch node or the source terminal, and decides whether each destination address of the first set is accommodated in the switch node. Based on the decision, the switch node divides the first set into a plurality of second sets each corresponding to one route of the switch node. Each second set is transmitted to the next switch node through a corresponding route. The next switch node performs the same steps as the switch node mentioned above.

13 Claims, 19 Drawing Sheets

MEMBER TERMINAL

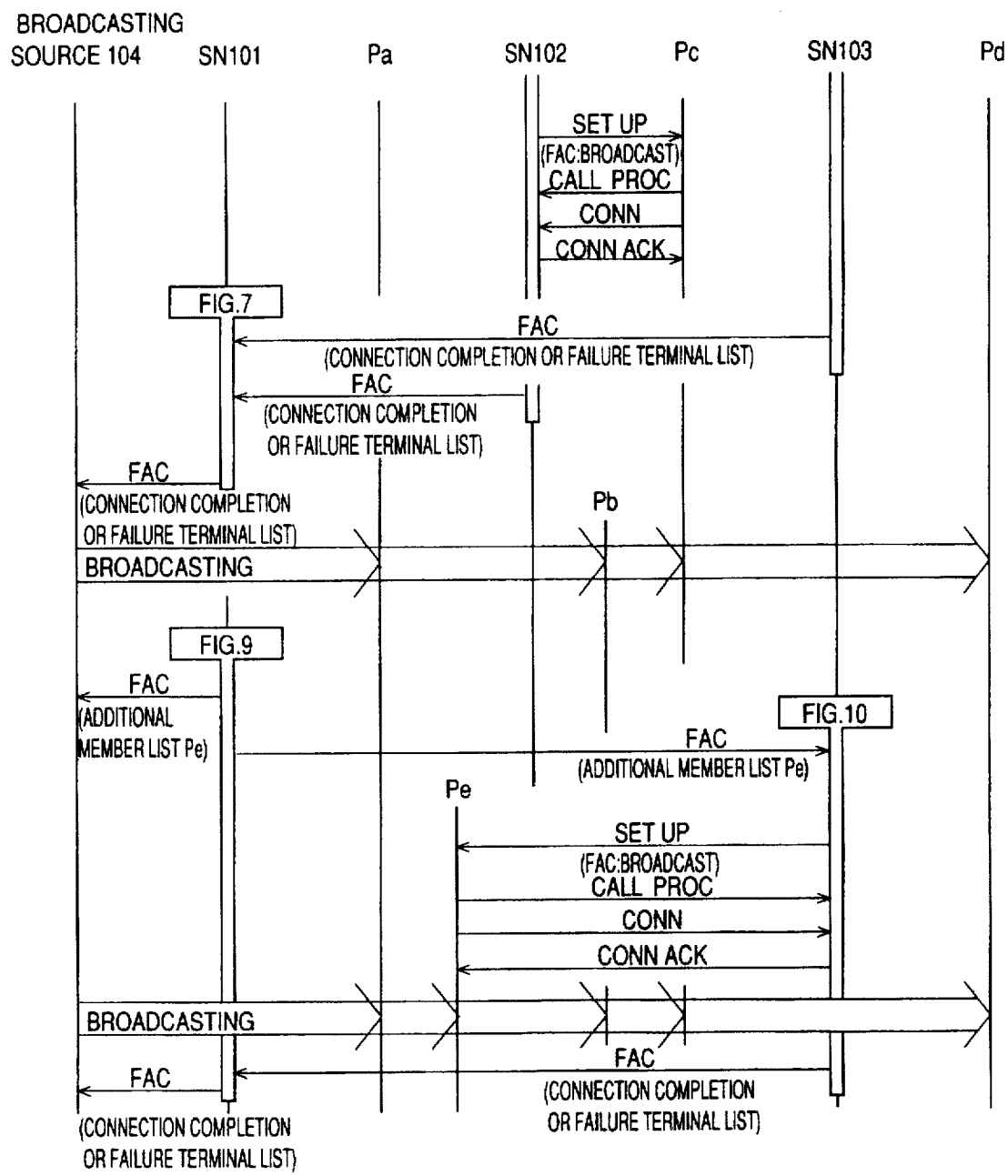

MEMBER TERMINAL

PATH SETTING SYSTEM FOR BROADCAST SERVICE IN SWITCHING NETWORK

BACKGROUND OF THE INVENTION

1. Field of the Invention

The present invention relates to a broadcast service system in a switching network, and particularly to a path setting method and system for a broadcast service through the switching network.

2. Description of the Prior Art

In a switching network which is composed of plural switch nodes each accommodating plural subscriber terminals, when an originating terminal broadcasts data to plural member terminals through the switch nodes, it is necessary for the originating side to determine transit routes so as to efficiently transfer the data to the member terminals located dispersedly on plural routes.

An example of branching systems for broadcasting of this kind has been disclosed in Japanese Patent Laid-open Publication No. 62-179243. This system is provided with a routing information generating means which generates routing information for broadcasting (including the number of branches, branching destinations, member terminals, member terminal numbers in the respective switch nodes) in the switching network. An originating-side switch node accommodating the originating terminal receives the routing information from the routing information generating means, and edits the routing information for each switch node. The edited routing information are successively transferred from the originating-side switch node to the downstream switch nodes through routing information signal lines other than data transmission lines. Each of the switch nodes sets branching paths directed to the respective downstream switch nodes by identifying the number of member terminals in its own switch node, their terminal numbers, the number of the downstream switch nodes as their branching destinations, and the respective identification numbers of the downstream switch nodes.

According to the conventional system mentioned above, a switch node which has received a request for broadcasting gains access to the routing information generating means provided in a specific switch node or within its network, and receives the routing information necessary for broadcasting the service from the routing information generating means. After that, the routing information is edited for each switch node and then successively transmitted to its downstream switch nodes through the routing information signal line.

Therefore, the conventional system has a disadvantage that the branch path setting operation requires a relatively long time, resulting in reduced processing efficiency. Further, this system configuration causes the increased cost since it needs an extra transmission line for transmitting the routing information in addition to the data transmission line for transmitting broadcast service data.

Furthermore, it is necessary for the originating-side switch node to inquire again about the routing information in case that a downstream switch node cannot set branch paths because of failure of a transit trunk or the like.

SUMMARY OF THE INVENTION

An object of the invention is to provide a method and system which can broadcast a service to a plurality of member terminals without reducing the efficiency of the switching network.

Another object of the invention is to provide a broadcast service system which can efficiently set branch paths in each switch node without inquiring of a specific switch node about the routing information for branch connection.

According to the present invention, the branch path setting in the switching network is performed by each switch node receiving destination addresses from a previous node, transmitting necessary destination addresses to a next node, and connecting its own destination terminals specified by the received destination addresses to the broadcasting source terminal.

More specifically, a set of destination addresses of the destination terminals is generated at the source terminal, and each of the destination addresses is transmitted from the source terminal to a destination switch node accommodating the destination terminal through one or more switch node on a route. Each switch node on the route receives a first set of destination addresses from a previous element which is one of a previous switch node and the source terminal, and decides whether a destination terminal of each of destination addresses of the first set is accommodated in the switch node. Based on the decision, the switch node divides the first set of destination addresses into a plurality of second sets of destination addresses, each of the second sets corresponding to one route of the switch node. Finally, each of the second sets of destination addresses is transmitted to the next switch node through a route corresponding to each of the second sets. The next switch node performs the same steps as the switch node mentioned above. In this way, the switch nodes forms branch paths through which the broadcast service signal is provided to all the destination terminals.

The present invention may be applied to an ISDN switching network. More specifically, after establishing a connection to a previous element which is one of a previous switch node and the source terminal by a connection sequence using a SETUP message, a first set of destination addresses is received from the previous element through the established connection. Similarly, each switch node establishes a connection to a destination terminal based on the predetermined set, and after establishing a connection to a next switch node corresponding to each of the second sets other than the predetermined set, each of the second sets of destination addresses is transmitted to the next switch node.

BRIEF DESCRIPTION OF THE DRAWINGS

FIG. 3B is a chart showing the remaining part of connection sequence as shown in FIG. 3A;

DETAILED DESCRIPTION OF THE PREFERRED EMBODIMENTS

Figure 1:
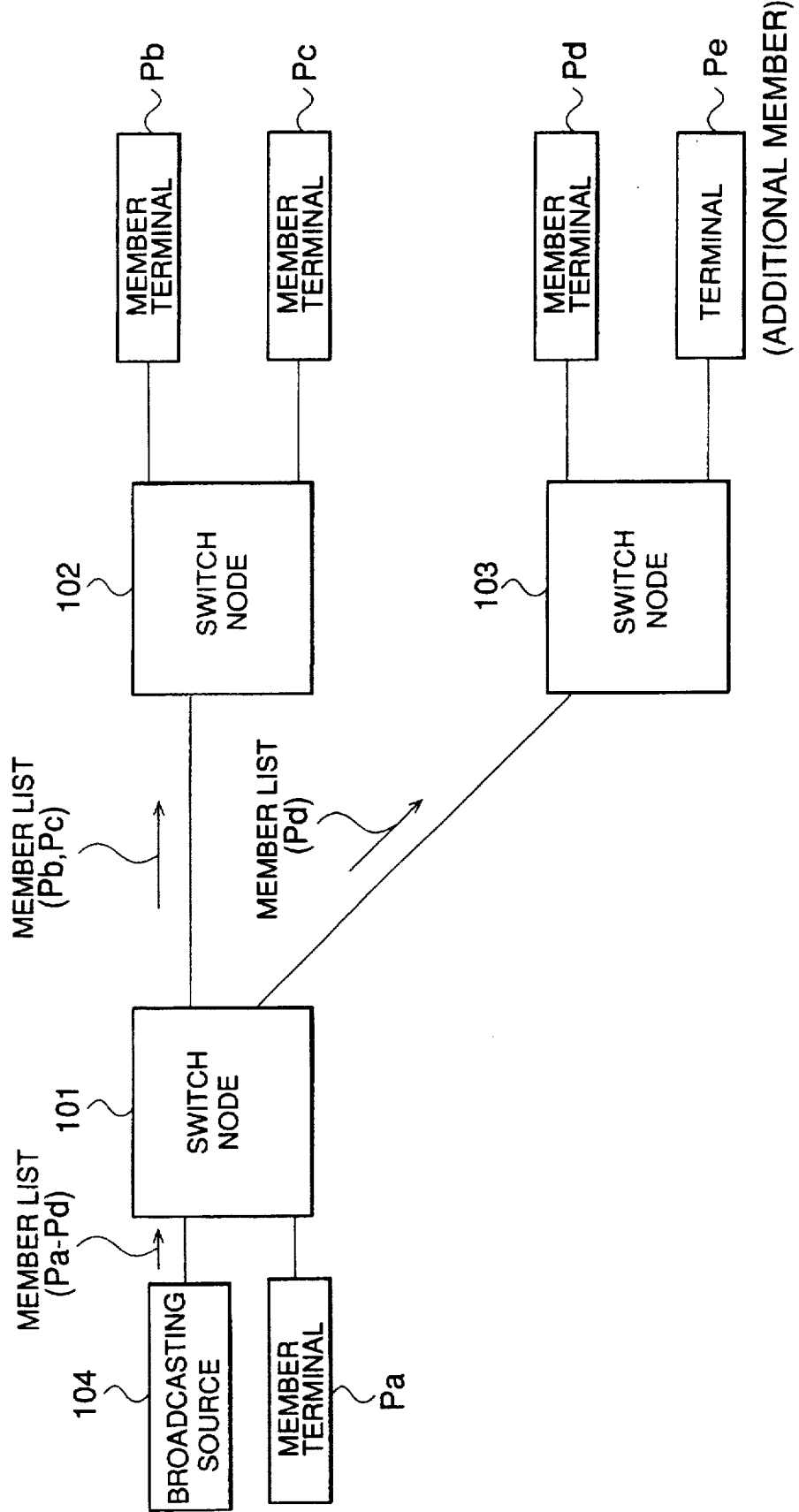
FIG. 1 is a block diagram showing an example of a network configuration for explaining an embodiment according to the invention.

An embodiment of the invention is described hereinafter referring to the drawings. For simplicity, taking an ISDN switching network including three switch nodes for an example, the network configuration of the embodiment is described referring to FIGS. 1 and 2, the connection sequence of member terminals referring to FIGS. 3A, 3B to FIG. 7, the member addition sequence referring to FIGS. Pa, Pb to FIG. 10, and the disconnection sequence referring to FIGS. 11 to 16.

As illustrated in FIG. 1, a switching network is composed of three switch nodes 101–103 each accommodating a plurality of subscriber terminals and a broadcasting source 104 which is connected as a subscriber to the switch node 101. In this figure, it is further assumed that the switch node 101 accommodates a member terminal Pa, the switch node 102 accommodates two member terminals Pb and Pc, and the switch node 103 accommodates a member terminal Pd as well as a subscriber terminal Pe which will be added to the broadcasting system later.

Figure 2:
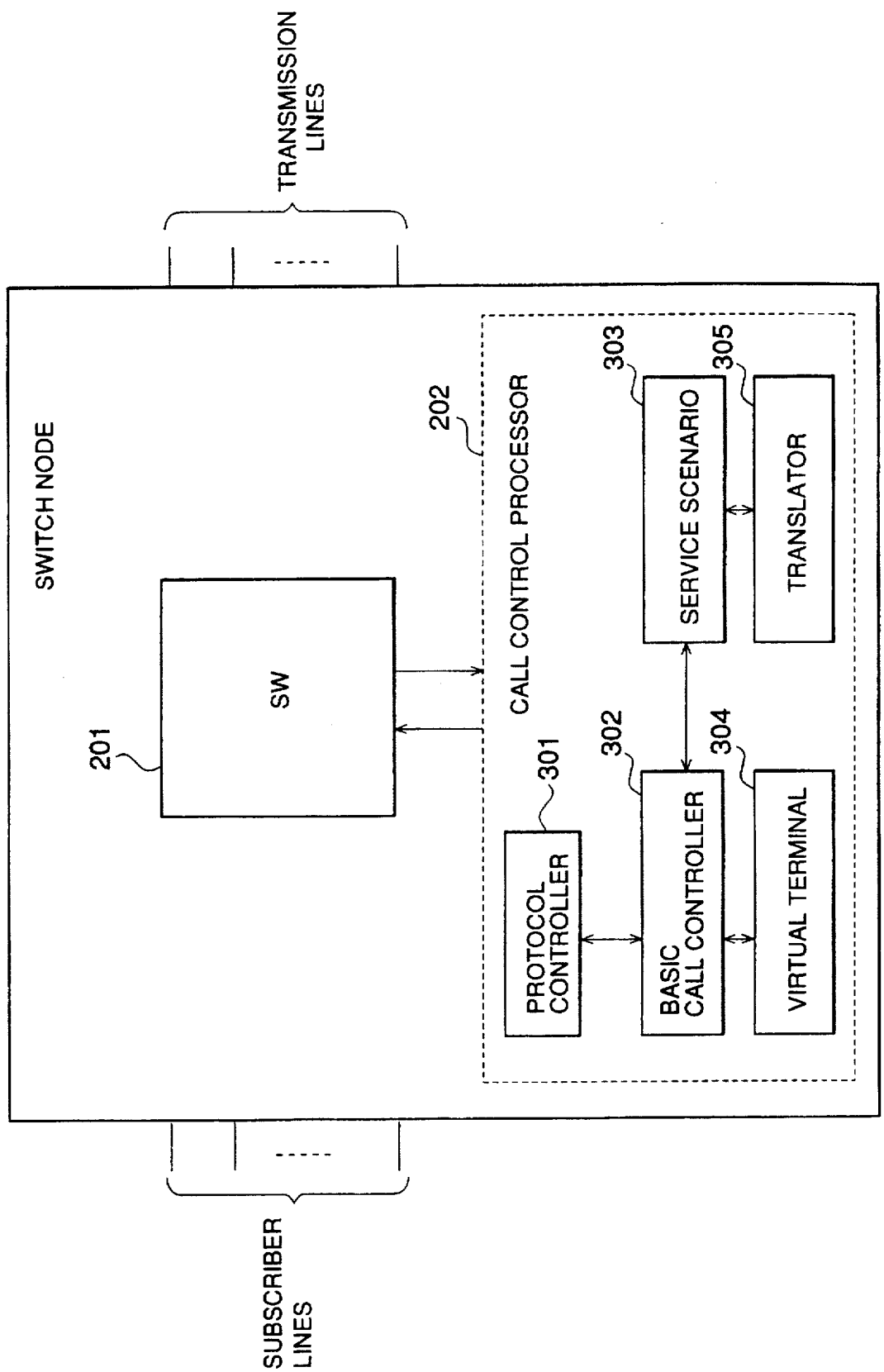
FIG. 2 is a schematic block diagram of a switch node having a call control processor according to the embodiment of the invention.

Referring to FIG. 2, each of the switch nodes 101–103 is composed of a switch 201 and a call control processor 202. In the switch node 101, for instance, the broadcasting source 104 is connected to a subscriber line, and the member terminal Pa to another subscriber line. Further, a transmission line is connected to the switch node 102 and another transmission line to the switch node 103. According to the embodiment, the switch node 101 makes an interconnection such that an incoming line of the broadcast service is connected to the one subscriber line and the two transmission lines, as described in detail later. It is the same with the switch node 102 and 103.

The call control processor 202 is composed of a protocol controller 301 according to Q931 protocol, a basic call controller 302 for performing a basic connection or disconnection process for each call, a service scenario 303 for performing specific control for broadcasting services, a virtual terminal 304 which makes termination of a call control message within the switch node, and a translator 305 for determining transmission routes by translating member lists into subscriber numbers.

Member Connection for Broadcast Service

First, a call connection for a broadcast service will be described. In this case, the case where the broadcasting source 104 provides a broadcasting service to the member terminals Pa to Pd is described as an example.

Figure 3A:
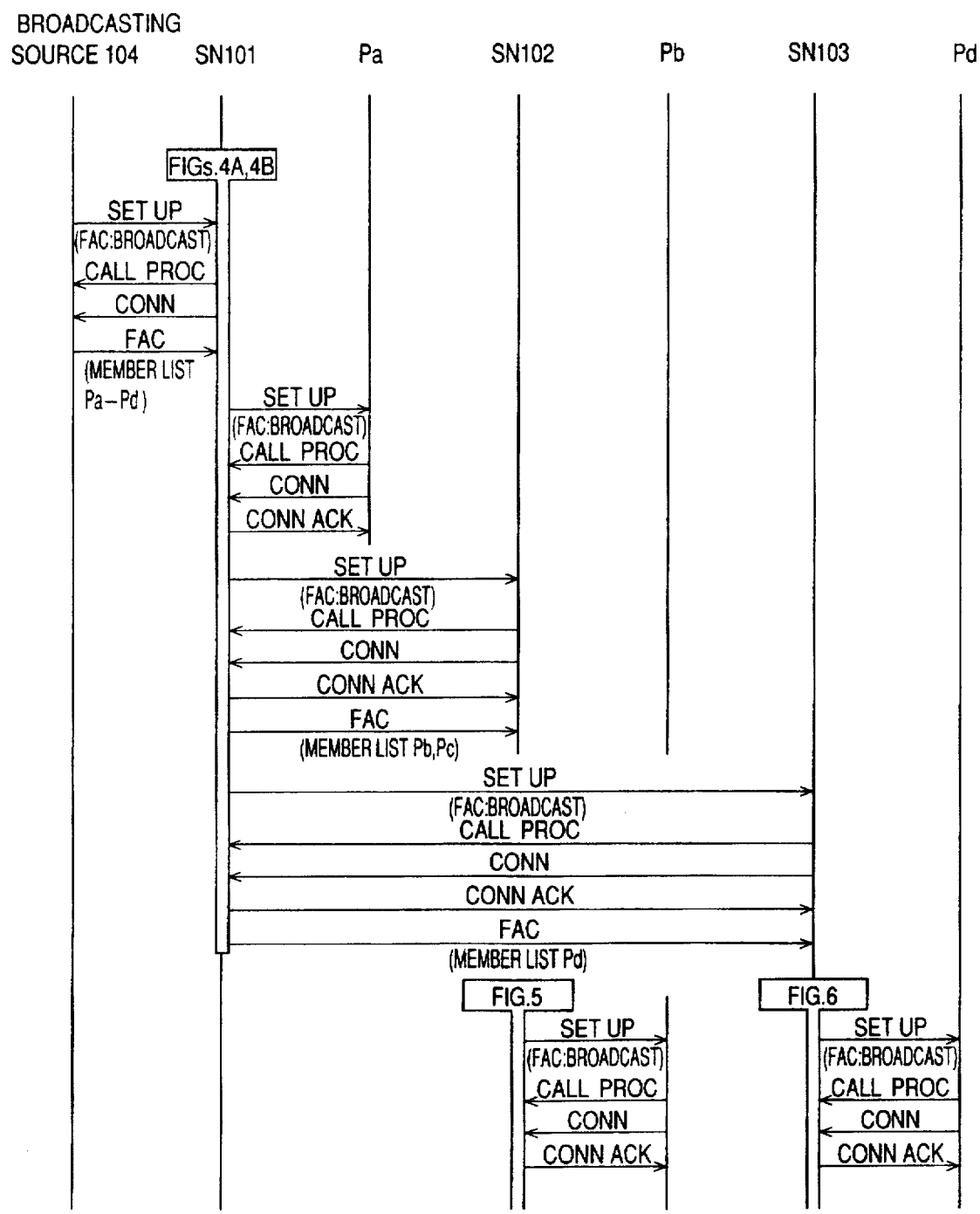
FIG. 3A is a chart showing a part of connection sequence among an originating terminal, member terminals, and switch nodes according to the embodiment of the invention.

As shown in FIGS. 3A and 3B, a broadcasting source 104 starts to make connection for a broadcast service by transmitting a SETUP message having "Broadcast Service" set therein as a facility (FAC) information element to the switch node (SN) 101. The switch node 101 further transmits the SETUP messages to the member terminal Pa, the switch nodes 102 and 103, respectively. Each of the switch nodes 101–103 performs branching connections in the following manner.

Branching Connection of Switch Node 101

Figure 4A:
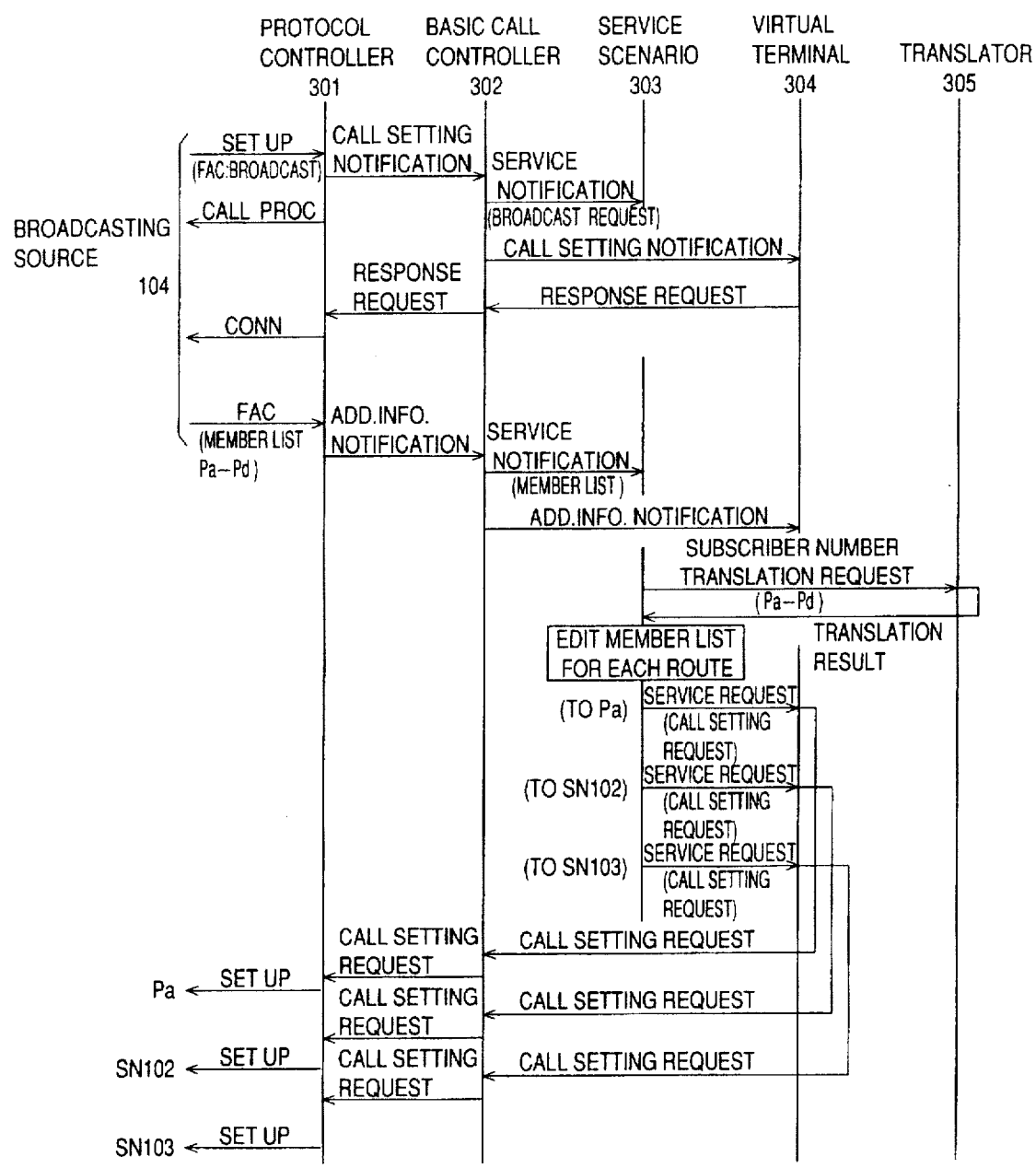
FIG. 4A is a chart showing a part of sequence of branch connection in a source-side switch node 101 according to the embodiment of the invention.
Figure 4B:
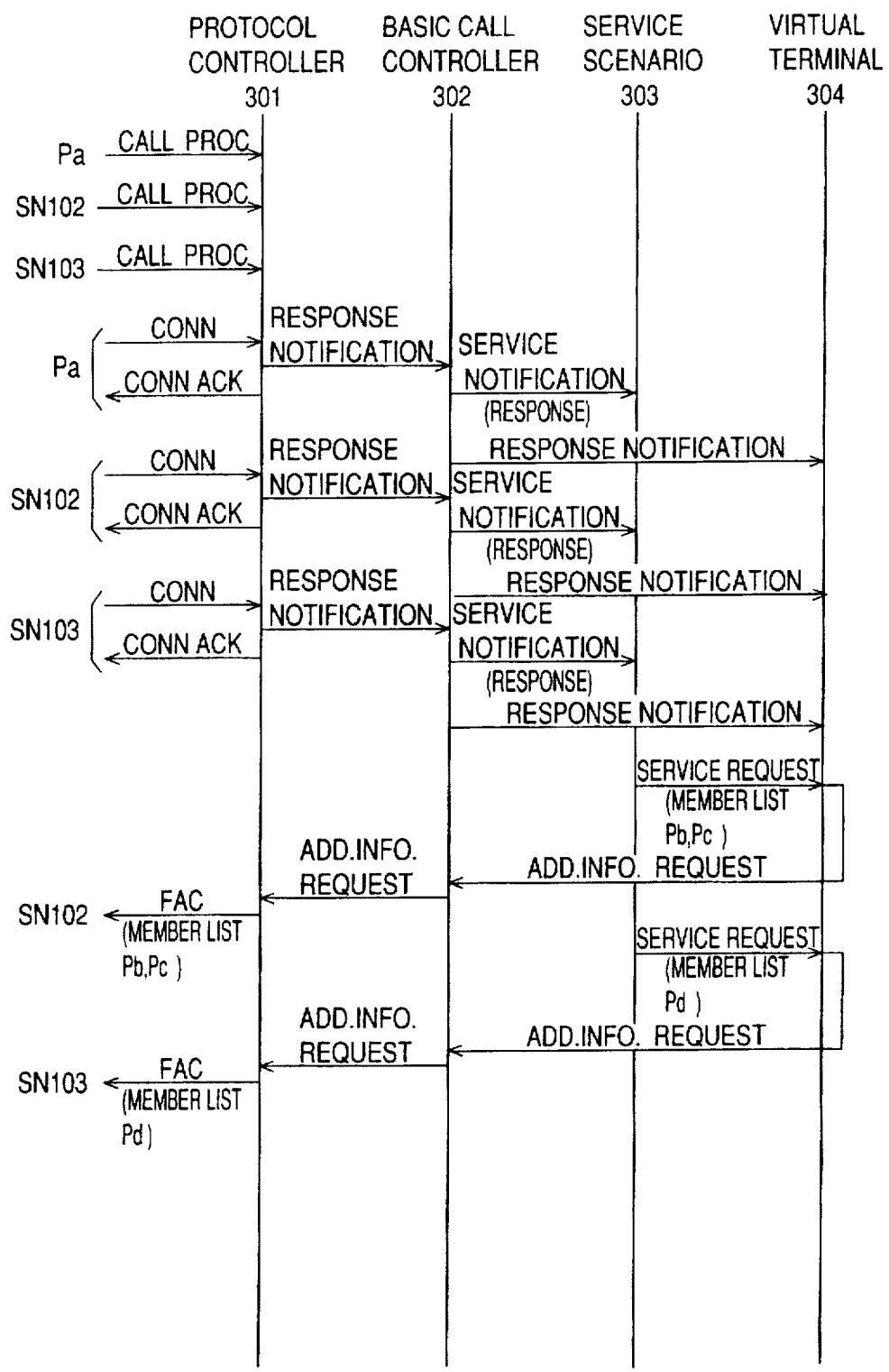
FIG. 4B is a chart showing the remaining part of sequence of branch connection as shown in FIG. 4A.

Referring to FIGS. 4A and 4B, a branch path setting process in the switch node 101 is described. On receipt of the SETUP message from the broadcasting source 104, the protocol controller 301 of the switch node 101 sends a "Call Setting Notification" to the basic call controller 302 and transmits a call proceeding (CALL PROC) message indicating the call setting acceptance back to the broadcasting source 104. The basic call controller 302 sends the "Call Setting Notification" to the virtual terminal 104 and notifies the service scenario 303 of a request for broadcast service connection by means of a "Service Notification". The virtual terminal 304, receiving the call setting notification from the basic call controller 302, sends a "Request for Response" back to the protocol controller 301 through the basic call controller 302. When receiving the "Request for Response" from the basic call controller 302, the protocol controller 301 transmits a response message (CONN) back to the broadcasting source 104. As shown in FIG. 3A, the broadcasting source 104 which has received the CONN message stores the subscriber numbers of the member terminals Pa, Pb, Pc, and Pd into a facility (FAC) massage and then transmits it to the switch node 101. In other words, on receipt of the CONN message, the broadcasting source 104 produces a member list containing the respective identification numbers of the member terminals Pa–Pd and sends the FAC message conveying the member list back to the switch node 301.

In FIG. 4A, the protocol controller 301 in the switch node 101, receiving the FAC message, sends an "Additional Information Notification" (add. info. notification) to the basic call controller 302 which in turn sends the "Additional Information Notification" to the virtual terminal 304 and delivers the member list to the service scenario 303 by means of the "Service Notification". When receiving the member list from the basic call controller 302, the service scenario 303 determines whether each of the member terminals Pa to Pd is a subscriber in its own switch node 101 or in other switch nodes. After the member terminals Pa to Pd are divided into branching groups (here three groups), the service scenario 303 requests translation of subscriber numbers of the translator 305 ("Request for Translation of Subscriber Numbers") so as to find their routes.

Using a "Result of Translation" received from the translator 305, the service scenario 303 edits a member list for each of the routes such that a first group for its own switch node 101 includes the member terminal Pa, a second group for the switch node 102 includes the member terminals Pb and Pc, and a third group for the switch node 103 includes the member terminal Pd. According to the edited member list, the service scenario 303 makes a service request for call setting to the virtual terminal 304 for each route. The virtual terminal 304 sends a "Request for Call Setting" for each route to the protocol controller 301 through the basic call controller 302, and then the protocol controller 301 transmits the SETUP message to each of the member terminal Pa, the switch node 102, and the switch node 103.

As shown in FIG. 4B, the switch node 101 receives the CALL PROC messages corresponding to the respective SETUP messages from the member terminal Pa, the switch node 102, and the switch node 103. Subsequently, after receiving the CONN message from each of the member terminal Pa, the switch node 102, and the switch node 103, the protocol controller 301 in the switch node 101 sends a "Response Notification" to the basic call controller 302 and transmits a response confirmation (CONN ACK) message to each of the member terminal Pa, the switch node 102, and the switch node 103. The basic call controller 302 sends the respective "Response Notifications" to the virtual terminal 304 after notifying the service scenario 303 that the member terminal Pa, the switch node 102, and the switch node 103 have responded through the "Service Notification". The service scenario 303, receiving the "Service Notification", notifies the virtual terminal 304 of a first member list including the subscriber numbers of the member terminals Pb, Pc, and Pd. The virtual terminal 304 sends the member lists of member terminals edited for each route, namely, for each of the switch node 102 and switch node 103 to the protocol controller 301 through the basic call controller 302. The protocol controller 301 transmits the FAC messages having the respective edited member lists set therein to the switch node 102 and switch node 103.

Branching Connection of Switch Node 102

Figure 5:
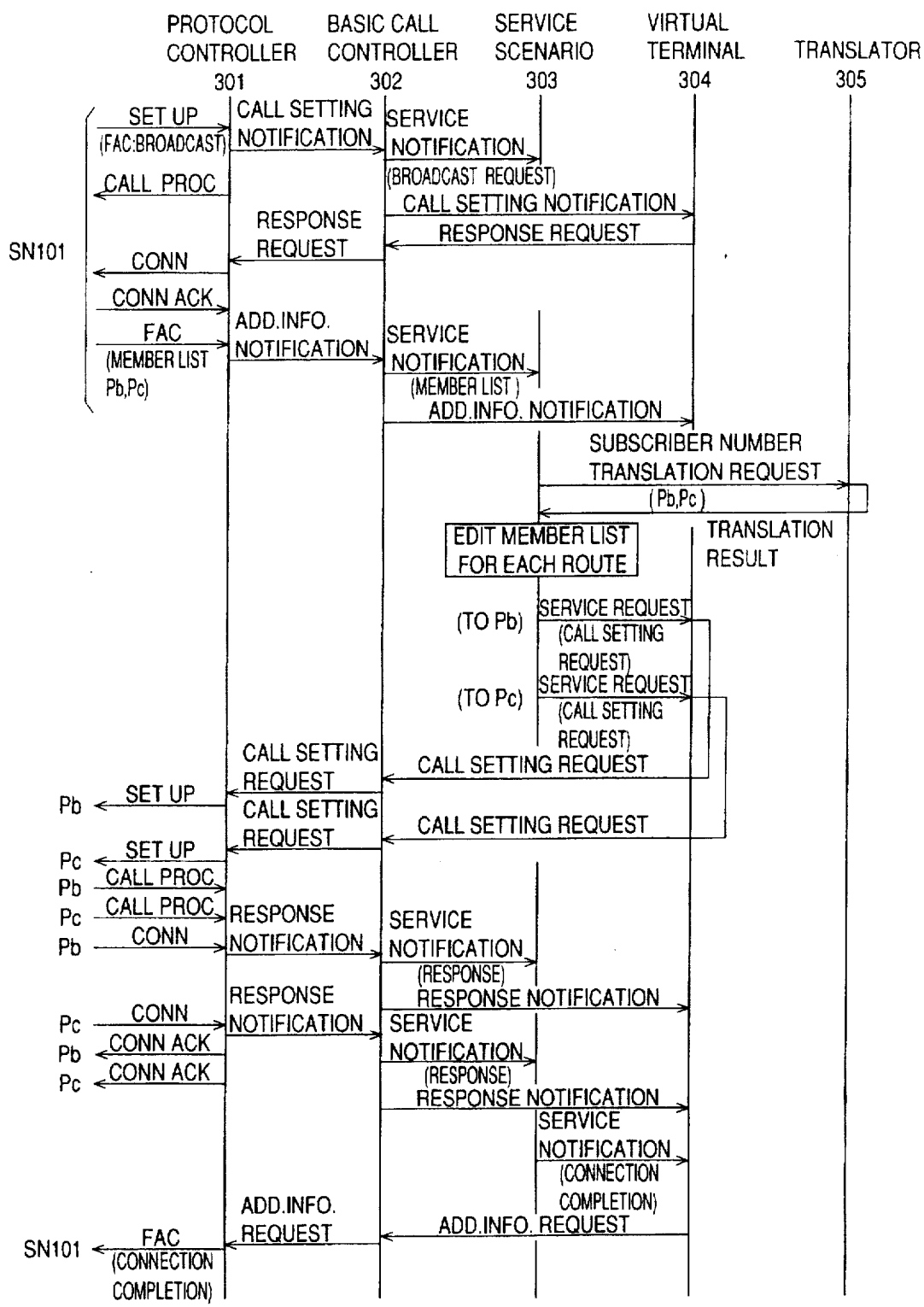
FIG. 5 is a chart showing a sequence of branch connection in a terminal-side switch node 102 according to the embodiment of the invention.

Referring to FIG. 5, a branch path setting process in the switch node 102 is described. On receipt of the SETUP message from the switch node 101, the protocol controller 301 of the switch node 102 sends a "Call Setting Notification" to the basic call controller 302 and transmits a call proceeding (CALL PROC) message indicating the call setting acceptance back to the switch node 101. The basic call controller 302 sends the "Call Setting Notification" to the virtual terminal 104 and notifies the service scenario 303 of a request for broadcast service connection by means of a "Service Notification". The virtual terminal 304, receiving the call setting notification from the basic call controller 302, sends a "Request for Response" back to the protocol controller 301 through the basic call controller 302. When receiving the "Request for Response" from the basic call controller 302, the protocol controller 301 transmits a response message (CONN) back to the switch node 101.

The protocol controller 301 in the switch node 102, receiving a CONN ACK message followed by an FAC message conveying the edited member list including member terminals Pb and Pc from the switch node 101, sends an "Additional Information Notification" (add. info. notification) to the basic call controller 302 which in turn sends the "Additional Information Notification" to the virtual terminal 304 and delivers the member list to the service scenario 303 by means of the "Service Notification". When receiving the member list from the basic call controller 302, the service scenario 303 determines whether each of the member terminals Pb and Pc is a subscriber in its own switch node 102 or in other switch nodes. After the member terminals Pb and Pc are divided into branching groups, the service scenario 303 requests translation of subscriber numbers of the translator 305 ("Request for Translation of Subscriber Numbers") so as to find their routes.

Using a "Result of Translation" received from the translator 305, the service scenario 303 edits a member list for each of the routes. In this case, the member list is edited such that the member terminals Pb and Pc are both accommodated in its own switch node 102. According to the edited member list, the service scenario 303 makes a service request for call setting to the virtual terminal 304 for each route. The virtual terminal 304 sends a "Request for Call Setting" for each route to the protocol controller 301 through the basic call controller 302, and then the protocol controller 301 transmits the SETUP message to each of the member terminals Pb and Pc.

The switch node 102 receives the CALL PROC messages corresponding to the respective SETUP messages from the member terminals Pb and Pc. Subsequently, after receiving the CONN message from each of the member terminals Pb and Pc, the protocol controller 301 of the switch node 102 sends a "Response Notification" to the basic call controller 302 and transmits a response confirmation (CONN ACK) message to each of the member terminals Pb and Pc. The basic call controller 302 sends the respective "Response Notifications" to the virtual terminal 304 after notifying the service scenario 303 that the member terminals Pb and Pc have responded through the "Service Notification".

After receiving the response from each of subscribers accommodated in its own switch node 102, that is, the member terminals Pb and Pc, the service scenario 303 notifies the virtual terminal 304 of completion of connection by transmitting a "Request for Service" to the virtual terminal 304. In case that there is a member terminal which has failed in connection in this time, the service scenario 303 sets a list containing its terminal identification number into the "Request for Service". The virtual terminal 304, receiving the "Request for Service", sends a "Additional Information Request" to the protocol controller 301 through he basic call controller 302. The protocol controller 301 produces an FAC message having connection completion based on the "Additional Information Request", and then transmits it to the switch node 101.

Branching Connection of Switch Node 103

Figure 6:
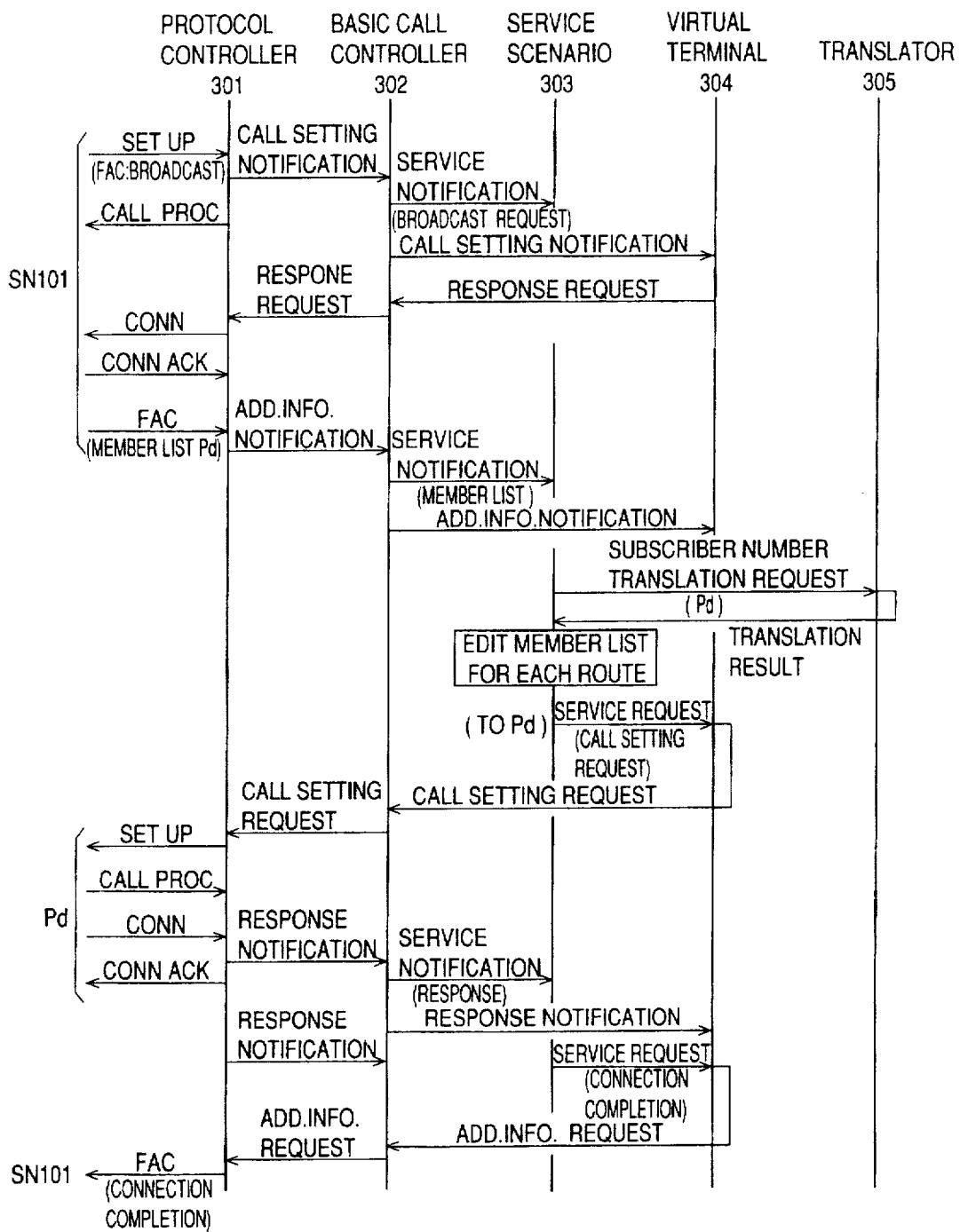
FIG. 6 is a chart showing a sequence of branch connection in another member terminal-side switch node 103 according to the embodiment of the invention.

Referring to FIG. 6, a branch path setting process in the switch node 103 is described. The switch node 103 is similar in a branch path setting process to the switch node 102. On receipt of the SETUP message from the switch node 101, the protocol controller 301 of the switch node 103 sends a "Call Setting Notification" to the basic call controller 302 and transmits a call proceeding (CALL PROC) message indicating the call setting acceptance back to the switch node 101. The basic call controller 302 sends the "Call Setting Notification" to the virtual terminal 104 and notifies the service scenario 303 of a request for broadcast service connection by means of a "Service Notification". The virtual terminal 304, receiving the call setting notification from the basic call controller 302, sends a "Request for Response" back to the protocol controller 301 through the basic call controller 302. When receiving the "Request for Response" from the basic call controller 302, the protocol controller 301 transmits a response message (CONN) back to the switch node 101.

The protocol controller 301 of the switch node 103, receiving a CONN ACK message followed by an FAC message conveying the edited member list including the member terminal Pd from the switch node 101, sends an "Additional Information Notification" (add. info. notification) to the basic call controller 302 which in turn sends the "Additional Information Notification" to the virtual terminal 304 and delivers the member list to the service scenario 303 by means of the "Service Notification". When receiving the member list from the basic call controller 302, the service scenario 303 determines whether the member terminal Pd is a subscriber in its own switch node 103 or in other switch nodes, and then requests translation of the subscriber number of the translator 305 ("Request for Translation of Subscriber Numbers") so as to find its route.

Using a "Result of Translation" received from the translator 305, the service scenario 303 edits a member list for the route. In this case, the member list is edited such that the member terminal Pd is accommodated in its own switch node 103. According to the edited member list, the service scenario 303 makes a service request for call setting to the virtual terminal 304 for the route. The virtual terminal 304 sends a "Request for Call Setting" for the route to the protocol controller 301 through the basic call controller 302, and then the protocol controller 301 transmits the SETUP message to the member terminal Pd.

The switch node 103 receives the CALL PROC messages corresponding to the respective SETUP messages from the member terminal Pd. Subsequently, after receiving the CONN message from the member terminal Pd, the protocol controller 301 of the switch node 103 sends a "Response Notification" to the basic call controller 302 and transmits a response confirmation (CONN ACK) message to the member terminal Pd. The basic call controller 302 sends the respective "Response Notifications" to the virtual terminal 304 after notifying the service scenario 303 that the member terminal Pd has responded through the "Service Notification".

After receiving the response from the member terminals accommodated in its own switch node 102, that is, the member terminal Pd, the service scenario 303 notifies the virtual terminal 304 of completion of connection by transmitting a "Request for Service" to the virtual terminal 304. In case that there is a member terminal which has failed in connection in this time, the service scenario 303 sets a list containing its terminal identification number into the "Request for Service". The virtual terminal 304, receiving the "Request for Service", sends a "Additional Information Request" to the protocol controller 301 through the basic call controller 302. The protocol controller 301 produces an FAC message having connection completion based on the "Additional Information Request", and then transmits it to the switch node 101.

Connection Completion of Switch Node 101

Figure 7:
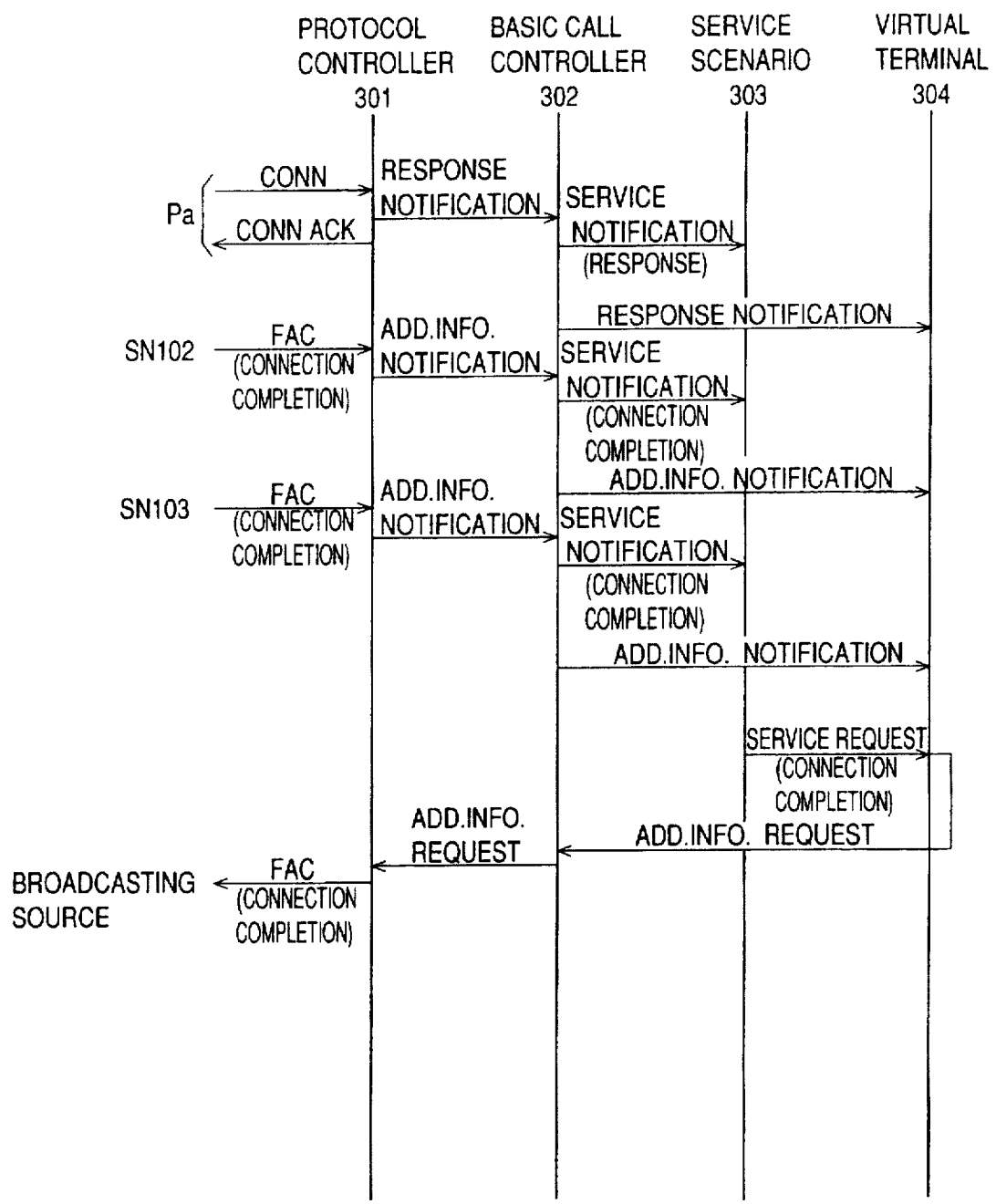
FIG. 7 is a chart showing a sequence of connection completion in the source-side switch node 101.

Referring to FIG. 7, when receiving a CONN message from the member terminal Pa, the protocol controller 301 of the switch node 101 sends a "Response Notification" to the basic call controller 302 and transmits a CONN ACK message back to the member terminal Pa. The basic call controller 302, receiving the response notification, notifies the service scenario 303 of a response of the member terminal Pa by means of "Service Notification", and then sends the "Response Notification" to the virtual terminal 304. When receiving an FAC message indicating connection completion from the switch node 102, the protocol controller 301 of the switch node 101 sends an "Additional Information Notification" to the basic call controller 302. Receiving the additional information notification, the basic call controller 302 notifies the service scenario 303 of the connection completion in the switch node 102 by sending the "Service Notification" to the service scenario 303, and then sends the "Additional Information Notification" to the virtual terminal 304. In the same way, when receiving an FAC message indicating connection completion from the switch node 103, the protocol controller 301 of the switch node 101 sends an "Additional Information Notification" to the basic call controller 302. Receiving the additional information notification, the basic call controller 302 notifies the service scenario 303 of the connection completion in the switch node 103 by sending the "Service Notification" to the service scenario 303, and then sends the "Additional Information Notification" to the virtual terminal 304.

In order to notify the broadcasting source 104 of connection completion of all member terminals, the service scenario 303 sends a "Request for Service" to the virtual terminal 304 to notify it of the connection completion of all member terminals included in the network. In case that there is any terminal which has failed in connection in the switch node 101, the switch node 102, and the switch node 103 in this time, the service scenario 303 of the switch node 101 stores into the "Request for Service" a list of terminals which have failed in connection at the switch node 101 in addition to a list of terminals which have failed in connection at the switch nodes 102 and 103. The virtual terminal 304, receiving the "Request for Service", sends a "Additional Information Request" to the protocol controller 301 through the basic call controller 302. The protocol controller 301 transmits an FAC message having connection completion therein to the broadcasting source 104.

In this way, the broadcasting source 104 receives the FAC message when the connection for the "Broadcast Service" required by the broadcasting source 104 is completed, and then starts the broadcast service (see FIG. 3B).

Additional Member Connection

Figure 8A:
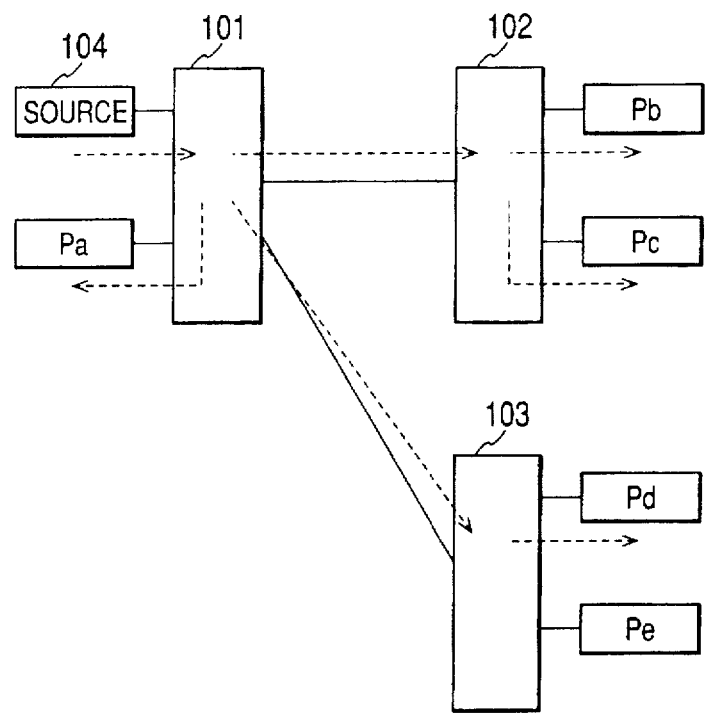
FIG. 8A is a schematic diagram of the switching network showing a state when starting a broadcasting service.

Referring to FIG. 8A, when the broadcast service is started, the switch node 101 receives the broadcast service data from the broadcasting source 104 and branches the broadcast service data into three streams which are directed to the member terminal Pa, the switch node 102, and the switch node 103, respectively. In the same way, the switch node 102 branches the broadcast service data received from the switch node 101 toward the member terminals Pb and Pc. The switch node 103 transmits the broadcast service data received from the switch node 101 to the member terminal Pd since its destination is only the member terminal Pd.

Figure 8B:
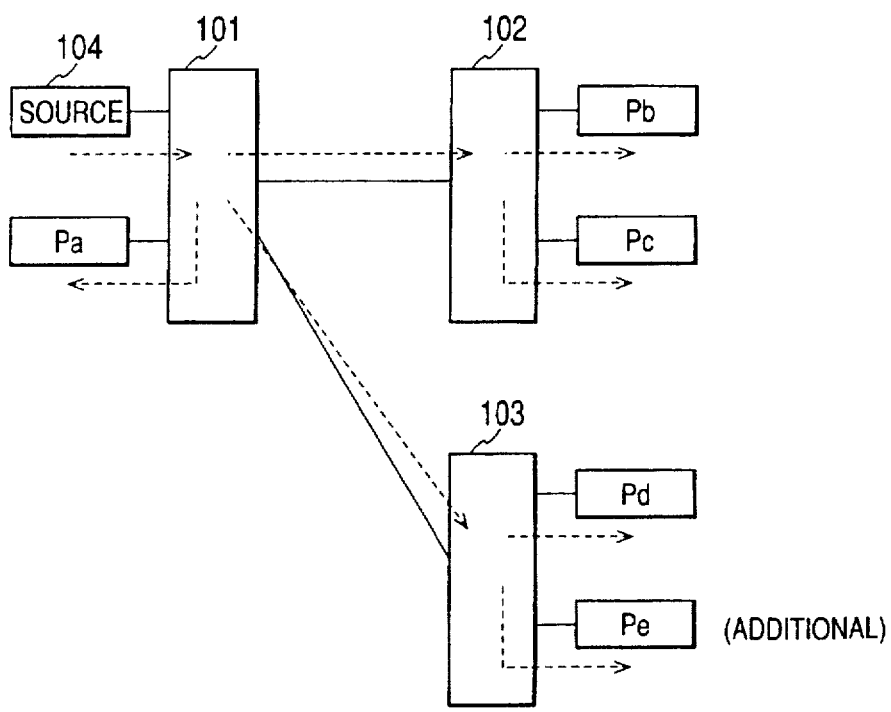
FIG. 8B is a schematic diagram of the switching network showing a state after adding a member terminal.

Referring to FIG. 8B, after starting the broadcast service as shown in FIG. 8A, a new member terminal Pe may participate in the broadcast service. Consideration must be given to such an additional member connection in the embodiment. As shown in FIG. 3B, the broadcasting source 104 produces an additional member list containing the subscriber number of the member terminal Pe which is stored in an FAC message. The FAC message including the subscriber number of the member terminal Pe is transmitted to the switch node 101.

Figure 9:
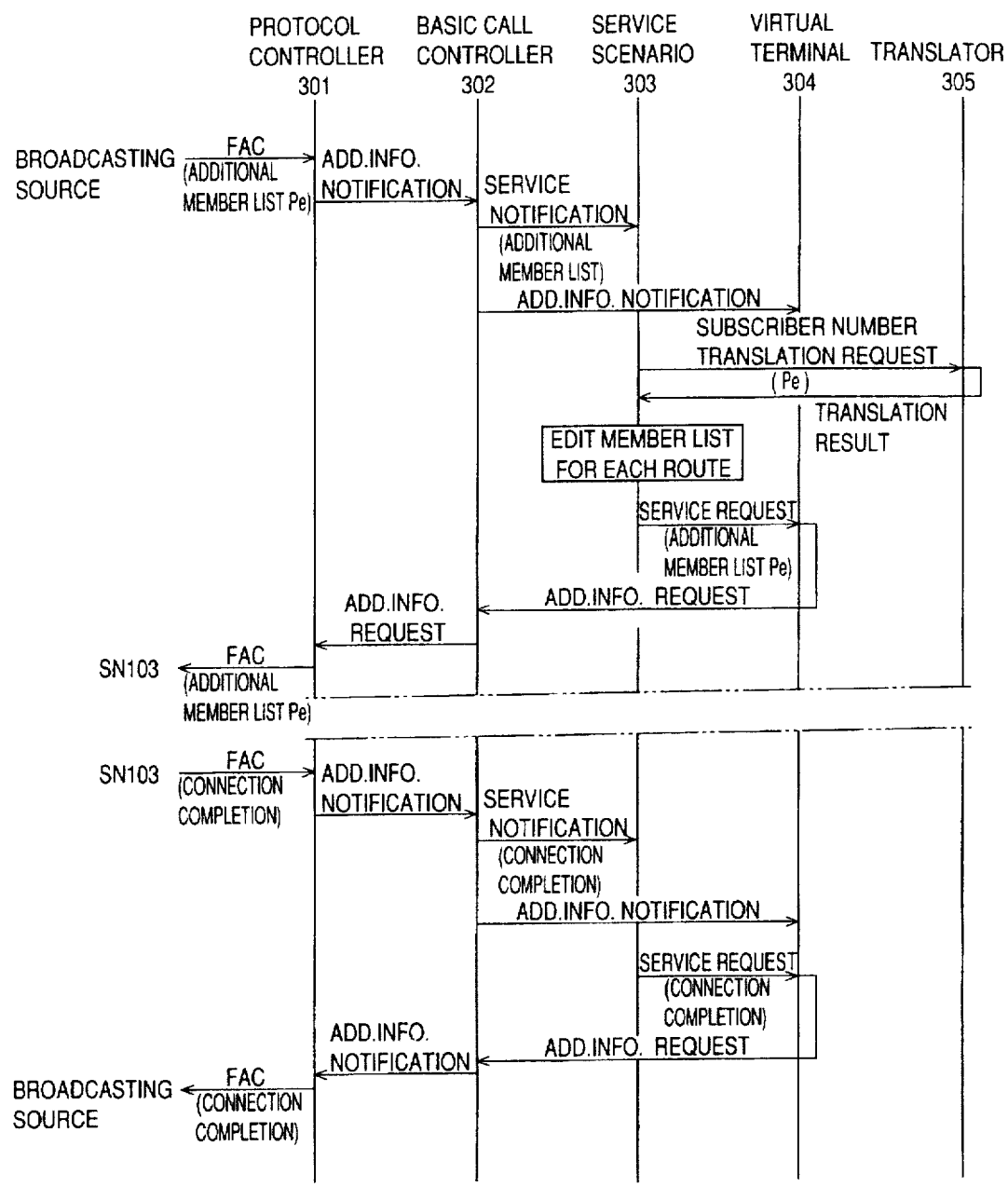
FIG. 9 is a chart showing a sequence of a member terminal-addition connection in the source-side switch node 101.

Referring to FIG. 9, the protocol controller 301 of the switch node 101, receiving the FAC message having the additional member list containing the additional member terminal Pe from the broadcasting source 104, sends an "Additional Information Notification" to the basic call controller 302. Receiving the additional information notification, the basic call controller 302 sends the "Additional Information Notification" to the virtual terminal 304 and delivers the list of additional members to the service scenario 303 by means of the "Service Notification". When receiving the additional member list from the basic call controller 302, the service scenario 303 determines whether the additional member terminal Pe is a subscriber in its own switch node 101 or in other switch nodes, and then requests translation of the subscriber number of the translator 305 ("Request for Translation of Subscriber Numbers") so as to find its route.

Using a "Result of Translation" received from the translator 305, the service scenario 303 edits the additional member list for the route. In this case, the member list is edited such that the additional member terminal Pe is accommodated in the switch node 103 which has already been connected. According to the edited member list, the service scenario 303 makes a service request for call setting to the virtual terminal 304 for the route. The virtual terminal 304 sends a "Request for Additional Information" for the route to the protocol controller 301 through the basic call controller 302. The protocol controller 301 transmits the FAC message including the additional member list to the switch node 103.

Figure 10:
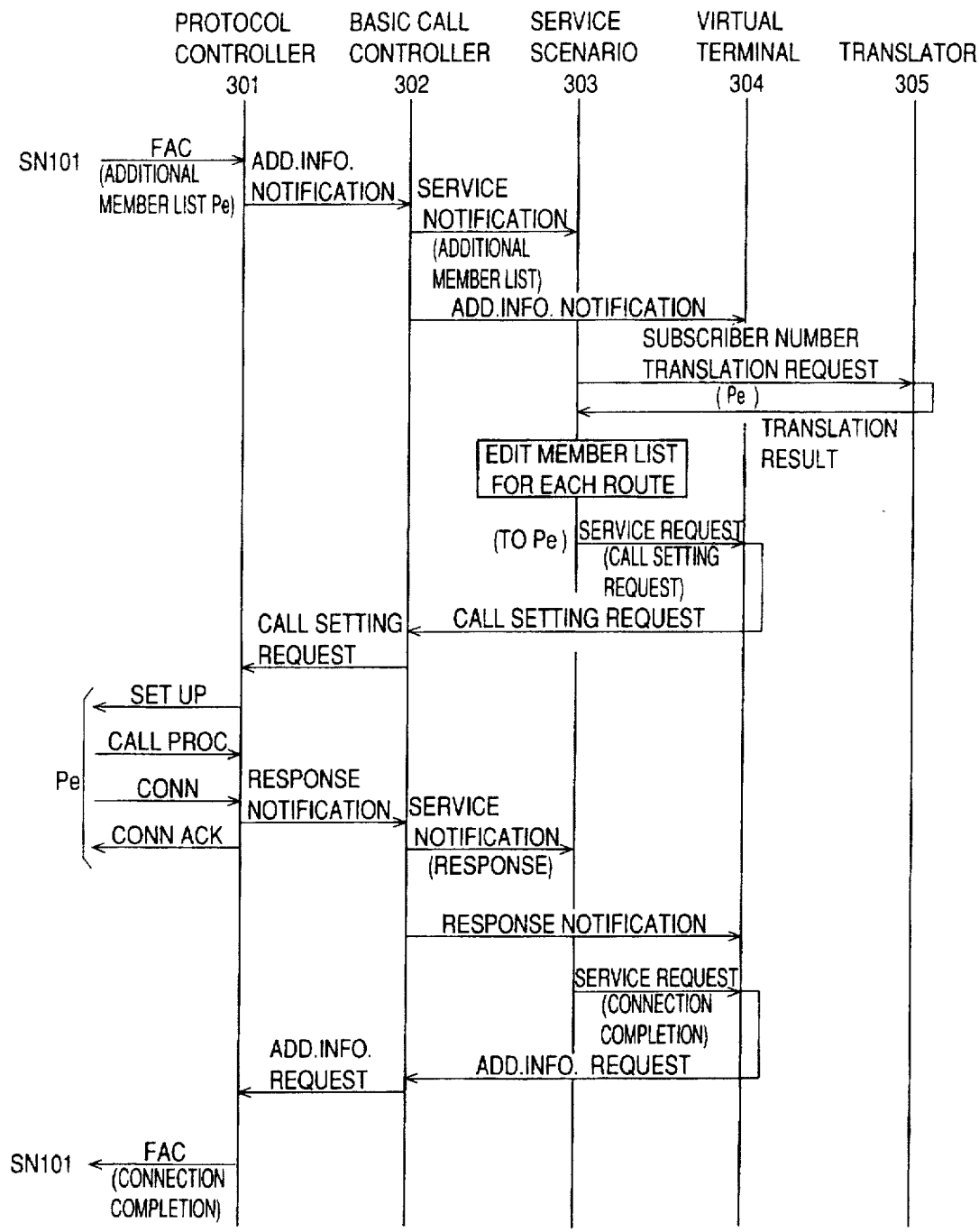
FIG. 10 is a chart showing a sequence of a member terminal-addition connection in the member terminal-side switch node 103.

Referring to FIG. 10, when receiving the FAC message having the list of additional members set therein from the switch node 101, the protocol controller 301 of the switch node 103 sends an "Additional Information Notification" (add. info. notification) to the basic call controller 302 which in turn sends the "Additional Information Notification" to the virtual terminal 304 and delivers the additional member list to the service scenario 303 by means of the "Service Notification". When receiving the additional member list from the basic call controller 302, the service scenario 303 determines whether the additional member terminal Pe is a subscriber in its own switch node 103 or in other switch nodes, and then requests translation of the subscriber number of the translator 305 ("Request for Translation of Subscriber Numbers") so as to find its route.

Using a "Result of Translation" received from the translator 305, the service scenario 303 edits a member list for the route. In this case, the member list is edited such that the additional member terminal Pe is accommodated in its own switch node 103. According to the edited member list, the service scenario 303 makes a service request for call setting to the virtual terminal 304 for the route. The virtual terminal 304 sends a "Request for Call Setting" for the route to the protocol controller 301 through the basic call controller 302, and then the protocol controller 301 transmits the SETUP message to the additional member terminal Pe.

The switch node 103 receives the CALL PROC messages corresponding to the respective SETUP messages from the additional member terminal Pe. Subsequently, after receiving the CONN message from the additional member terminal Pe, the protocol controller 301 of the switch node 103 sends a "Response Notification" to the basic call controller 302 and transmits a response confirmation (CONN ACK) message to the additional member terminal Pe. At the time when the CONN ACK message is transmitted to the additional member terminal Pe, the switch node 103 branches the broadcast service off to the additional member terminal Pe since the switch node 103 has already received the broadcast service data from the broadcasting source 104 through the switch node 101 to supply it to the member terminal Pd (see FIGS. 3B and 8B).

The basic call controller 302 sends the respective "Response Notifications" to the virtual terminal 304 after notifying the service scenario 303 that the additional member terminal Pe has responded through the "Service Notification". After receiving the response from the additional member terminal Pe accommodated in its own switch node 103, the service scenario 303 notifies the virtual terminal 304 of completion of connection by transmitting a "Request for Service" to the virtual terminal 304. In case that there is the additional member terminal which has failed in connection in this time, the service scenario 303 sets a list containing its terminal identification number into the "Request for Service". The virtual terminal 304, receiving the "Request for Service", sends an "Additional Information Request" to the protocol controller 301 through the basic call controller 302. The protocol controller 301 produces an FAC message indicating the connection completion based on the "Additional Information Request", and then transmits it to the switch node 101.

Returning to FIG. 9, the protocol controller 301 of the switch node 101, receiving the FAC message indicating the connection completion from the switch node 103, the protocol controller 301 of the switch node 101 sends an "Additional Information Notification" to the basic call controller 302. Receiving the additional information notification, the basic call controller 302 notifies the service scenario 303 of the connection completion in the switch node 103 by sending the "Service Notification" to the service scenario 303, and then sends the "Additional Information Notification" to the virtual terminal 304.

In order to notify the broadcasting source 104 of connection completion of the additional member terminal, the service scenario 303 sends a "Request for Service" to the virtual terminal 304 to notify it of the connection completion of the additional member terminal accommodated in the switch node 103. In case that the additional terminal has failed in connection in the switch node 103 in this time, the service scenario 303 of the switch node 101 stores into the "Request for Service" a list of terminals which have failed in connection at the switch node 103. The virtual terminal 304, receiving the "Request for Service", sends a "Additional Information Request" to the protocol controller 301 through the basic call controller 302. The protocol controller 301 transmits an FAC message having connection completion therein to the broadcasting source 104.

Disconnection Requested by Member Terminals

Figure 11:
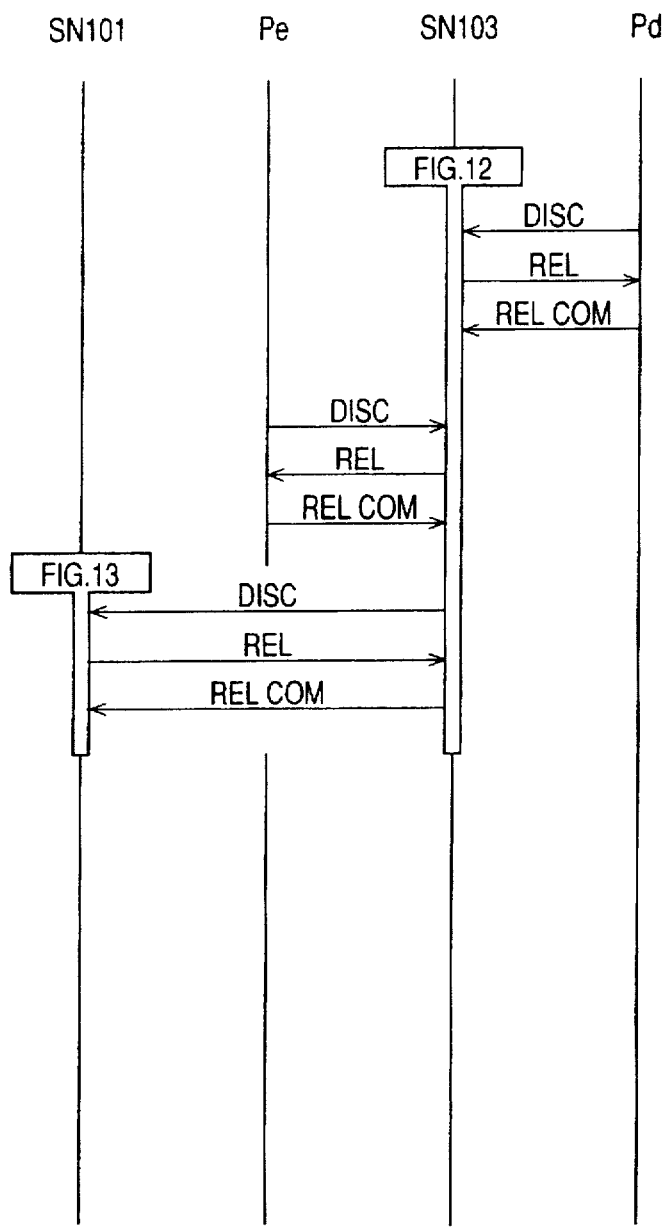
FIG. 11 is a chart showing a sequence of disconnection made by member terminals according to the embodiment of the invention.

As shown in FIG. 11, when the member terminals Pd and Pe transmit disconnection (DISC) messages to the switch node 103, the switch node 103 starts a disconnection sequence while communicating with the member terminals Pd, Pe, and the switch node 101.

Figure 12:
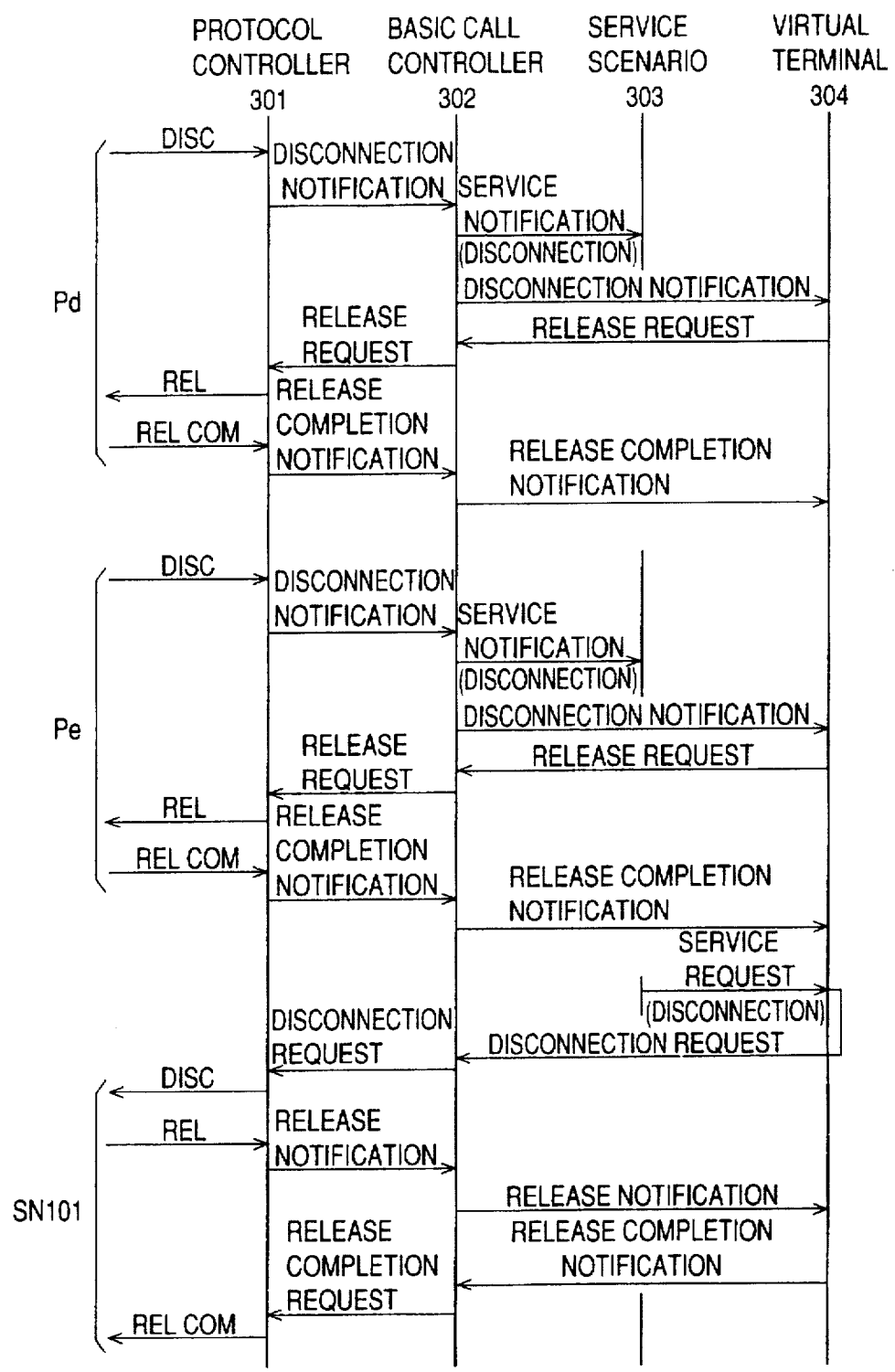
FIG. 12 is a chart showing a sequence of disconnection made by member terminals in the member terminal-side switch node 103 as shown in FIG. 11.

Referring to FIG. 12, the protocol controller 301 of the switch node 103, receiving the DISC message from the member terminal Pd, sends a "Disconnection Notification" to the basic call controller 302, and the basic call controller 302 sends the "Disconnection Notification" to the virtual terminal 304 and notifies the service scenario 303 of the disconnection by means of the "Service Notification". Receiving the service notification, the service scenario 303 realizes that the member terminal Pd has terminated reception of the broadcast service. The virtual terminal 304, receiving the disconnection notification, sends a "Request for Release" to the protocol controller 301 through the basic call controller 302, and the protocol controller 301 transmits a Release (REL) message to the member terminal Pd. When receiving a Release Completion (REL COM) message from the member terminal Pd, the protocol controller 301 sends a "Release Completion Notification" to the virtual terminal 304 through the basic call controller 302 to notify it of the release completion of the member terminal Pd. At this point of time, the switch node 103 stops transmitting the broadcast service data to the member terminal Pd.

Similarly, receiving a DISC message from the member terminal Pe, the protocol controller 301 of the switch node 103, receiving the DISC message from the member terminal Pe, sends a "Disconnection Notification" to the basic call controller 302, and the basic call controller 302 sends the "Disconnection Notification" to the virtual terminal 304 and notifies the service scenario 303 of the disconnection by means of the "Service Notification". Receiving the service notification, the service scenario 303 realizes that the member terminal Pe has terminated reception of the broadcast service. The virtual terminal 304, receiving the disconnection notification, sends a "Request for Release" to the protocol controller 301 through the basic call controller 302, and the protocol controller 301 transmits a Release (REL) message to the member terminal Pe. When receiving a Release Completion (REL COM) message from the member terminal Pe, the protocol controller 301 sends a "Release Completion Notification" to the virtual terminal 304 through the basic call controller 302 to notify it of the release completion of the member terminal Pe. At this point of time, the switch node 103 stops transmitting the broadcast service data to the member terminal Pe.

Receiving the disconnection of a member terminal through the "Service Notification", the service scenario 303 judges whether all subscribers, that is, the member terminals Pd and Pe, of its own have terminated reception of the broadcast service. When all member terminals have terminated reception of the broadcast service, the service scenario 303 sends a "Request for Service" of disconnection to the virtual terminal 304 in order to notify the switch node 101 of termination of the broadcast service. The virtual terminal 304 sends a "Request for Disconnection" to the protocol controller 301 through the basic call controller 302, and the protocol controller 301 transmits a DISC message to the switch node 101. On receipt of an REL message from the switch node 101, the protocol controller 301 of the switch node 103 sends a "Release Notification" to the virtual terminal 304 through the basic call controller 302. The virtual terminal 304, receiving the "Release Notification", sends a "Request for Release Completion" to the protocol controller 301 through the basic call controller 302, and the protocol controller 301 transmits an REL COM message to the switch node 101.

Figure 13:
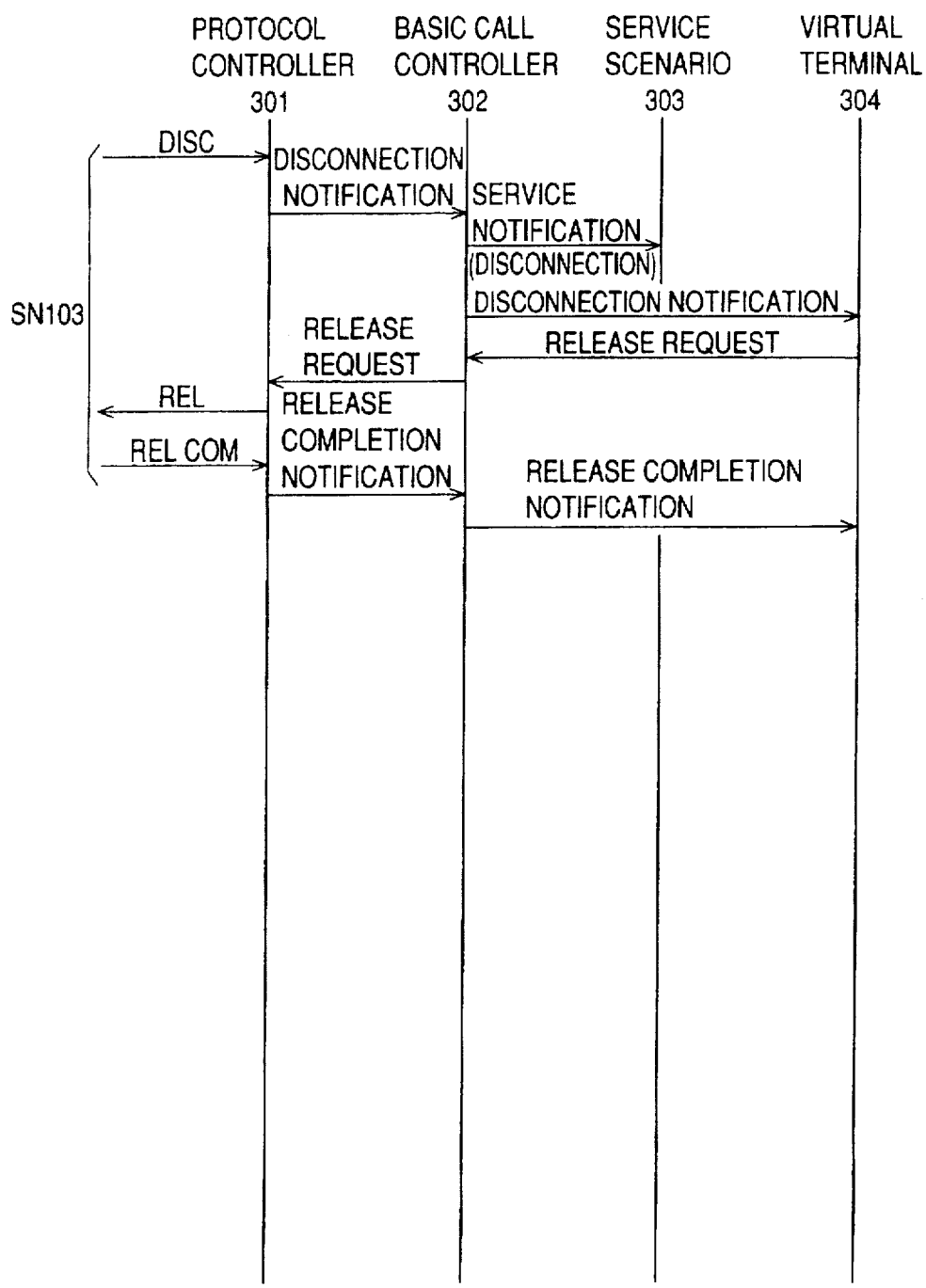
FIG. 13 is a chart showing a sequence of disconnection made by a member terminal side in the member terminal-side switch node 102 as shown in FIG. 11.

Referring to FIG. 13, when receiving the DISC message from the switch node 103, the protocol controller 301 of the switch node 101 sends a "Disconnection Notification" to the basic call controller 302, and the basic call controller 302 sends the "Disconnection Notification" to the virtual terminal 304 and notifies the service scenario 303 through the "Service Notification" that the switch node 103 has made disconnection. The service scenario 3 realizes based on the service notification received from the basic call controller 302 that the switch node 103 has terminated reception of the broadcast service. The virtual terminal 304, receiving the disconnection notification, sends a "Request for Release" to the protocol controller 301 through the basic call controller 302, and the protocol controller 301 transmits an REL message to the switch node 103. The protocol controller 301 of the switch node 101, when receiving an REL COM message from the switch node 103, sends a "Release Completion Notification" to the virtual terminal 304 through the basic call controller 302. At this point of time, the switch node 101 stops transmitting the broadcast service data to the switch node 103. In this way, by receiving the information of disconnecting reception of the broadcast service individually from the respective member terminals, the system terminates the broadcast service for only the member terminals requesting the service disconnect and releases the paths which have not been in use.

Disconnection Requested by Broadcasting Source

Figure 14:
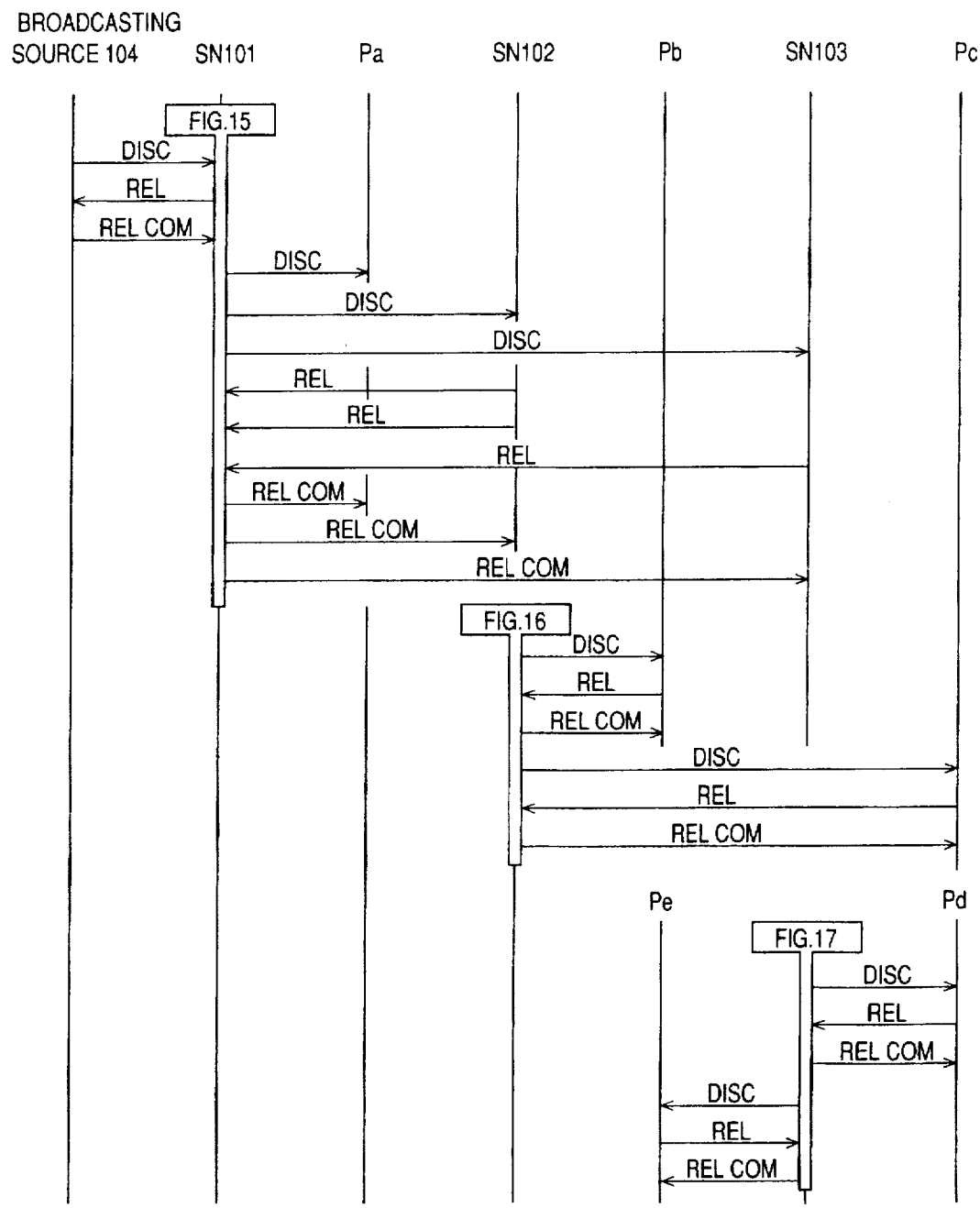
FIG. 14 is a chart showing a sequence of disconnection made by the broadcasting source side according to the embodiment of the invention.

Referring to FIG. 14, when the broadcasting source 104 transmits a DISC message to the switch node 101 in order to terminate the broadcast service, the switch node 101 transmits DISC messages to the switch nodes 102 and 103, respectively. Each of the switch nodes 101–103, receiving the DISC message, starts a disconnection sequence while communicating with the subscriber member terminals accommodated therein, as described hereinafter.

Figure 15:
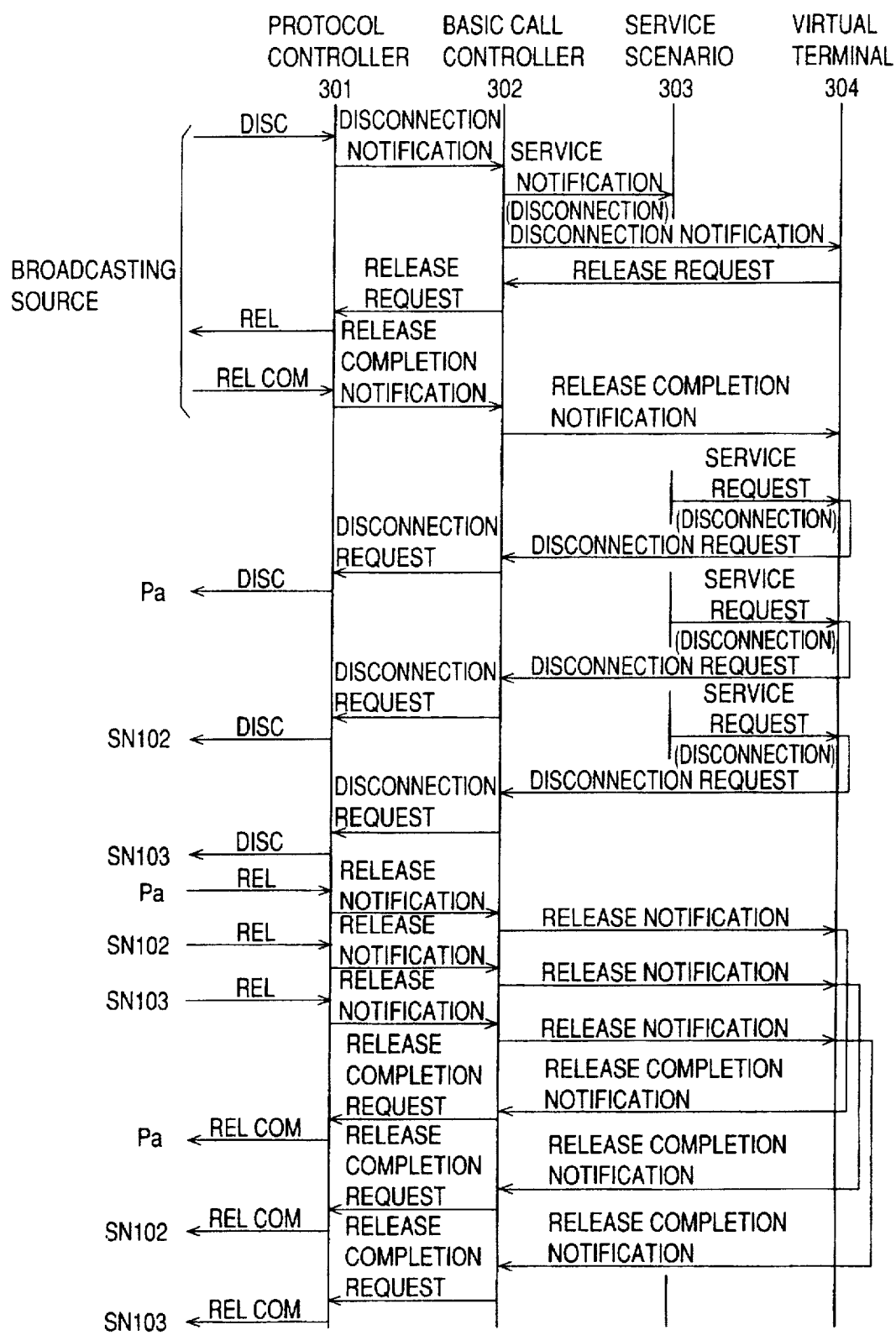
FIG. 15 is a chart showing a sequence of disconnection made in the broadcasting source-side switch node 101 as shown in FIG. 14.

Referring to FIG. 15, when receiving the DISC message from the broadcasting source 104, the protocol controller 301 of the switch node 101 sends a "Disconnection Notification" to the basic call controller 302, and the basic call controller 302 sends the "Disconnection Notification" to the virtual terminal 304 and notifies the service scenario 303 by means of the "Service Notification" that the broadcasting source 104 has disconnected the broadcast service. The virtual terminal 304 sends a "Request for Release" to the protocol controller 301 through the basic call controller 302, and the protocol controller 301 transmits an REL message to the broadcasting source 104.

The protocol controller 301 of the switch node 101, receiving an REL COM message from the broadcasting source 104, sends a "Release Completion Notification" to the virtual terminal 304 through the basic call controller 302. The service scenario 303 which has received the service notification realizes that the broadcasting source 104 has terminated the broadcast service. Therefore, the service scenario 303 sends to the virtual terminal 304 a "Request for Service" for each of the member terminal Pa, the switch node 102, and the switch node 103 in order to disconnect the broadcast service. The virtual terminal 304 sends a "Request for Disconnection" for each of the member terminal Pa, the switch node 102, and the switch node 103 to the protocol controller 301 through the basic call controller 302, and the protocol controller 301 transmits a DISC message to each of the member terminal Pa, the switch node 102, and the switch node 103.

When receiving an REL message from each of the member terminal Pa, the switch node 102, and the switch node 103, the protocol controller 301 of the switch node 101 sends a "Release Notification" to the virtual terminal 304 through the basic call controller 302. The virtual terminal 304 sends a "Request for Release Completion" to the protocol controller 301 through the basic call controller 302 and notifies it of the disconnection completion of the member terminal Pa, the switch node 102, and the switch node 103. And then the protocol controller 301 transmits an REL COM message to each of the member terminal Pa, the switch node 102, and the switch node 103.

Figure 16:
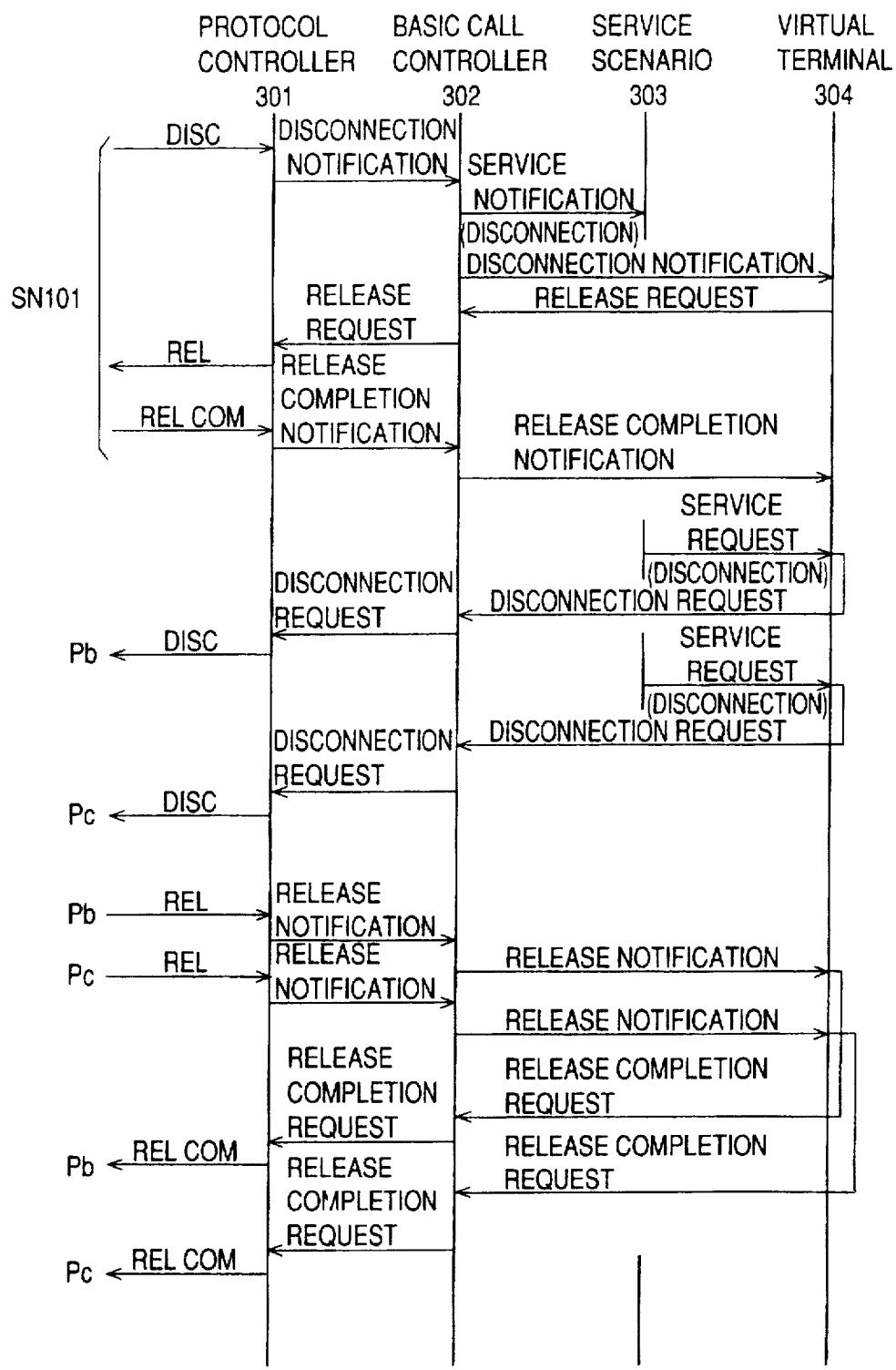
FIG. 16 is a chart showing a sequence of disconnection in the member terminal-side switch node 102 as shown in FIG. 14.

Referring to FIG. 16, the protocol controller 301 of the switch node 102, receiving the DISC message from the switch node 101, sends a "Disconnection Notification" to the basic call controller 302, and the basic call controller 302 sends the "Disconnection Notification" to the virtual terminal 304 and notifies the service scenario 303 through the "Service Notification" that the switch node 101 which is located upstream has made disconnection. The virtual terminal 304 sends a "Request for Release" to the protocol controller 301 through the basic call controller 302, and the protocol controller 301 transmits an REL message to the upstream switch node 101.

On receiving an REL COM message from the switch node 101, the protocol controller 301 of the switch node 102 sends a "Release Completion Notification" to the virtual terminal 304 through the basic call controller 302. The service scenario 303 which has received the service notification realizes that the switch node 101 which is located upstream has terminated the broadcast service and transmits a "Request for Service" to the virtual terminal 304 in order to disconnect the broadcast service for the member terminals Pb and Pc. The virtual terminal 304 sends a "Request for Disconnection" to the protocol controller 301 through the basic call controller 302, and the protocol controller 301 transmits a DISC message to each of the member terminals Pb and Pc.

The protocol controller 301 of the switch node 102, receiving REL messages from the member terminals Pb and Pc, sends a "Release Notification" to the virtual terminal 304 through the basic call controller 302. The virtual terminal 304 sends a "Request for Release Completion" to the basic call controller 302, and the basic call controller 302 transmits the "Request for Release Completion" to the protocol controller 301. The protocol controller 301 transmits an REL COM message to each of the member terminals Pb and Pc.

Figure 17:
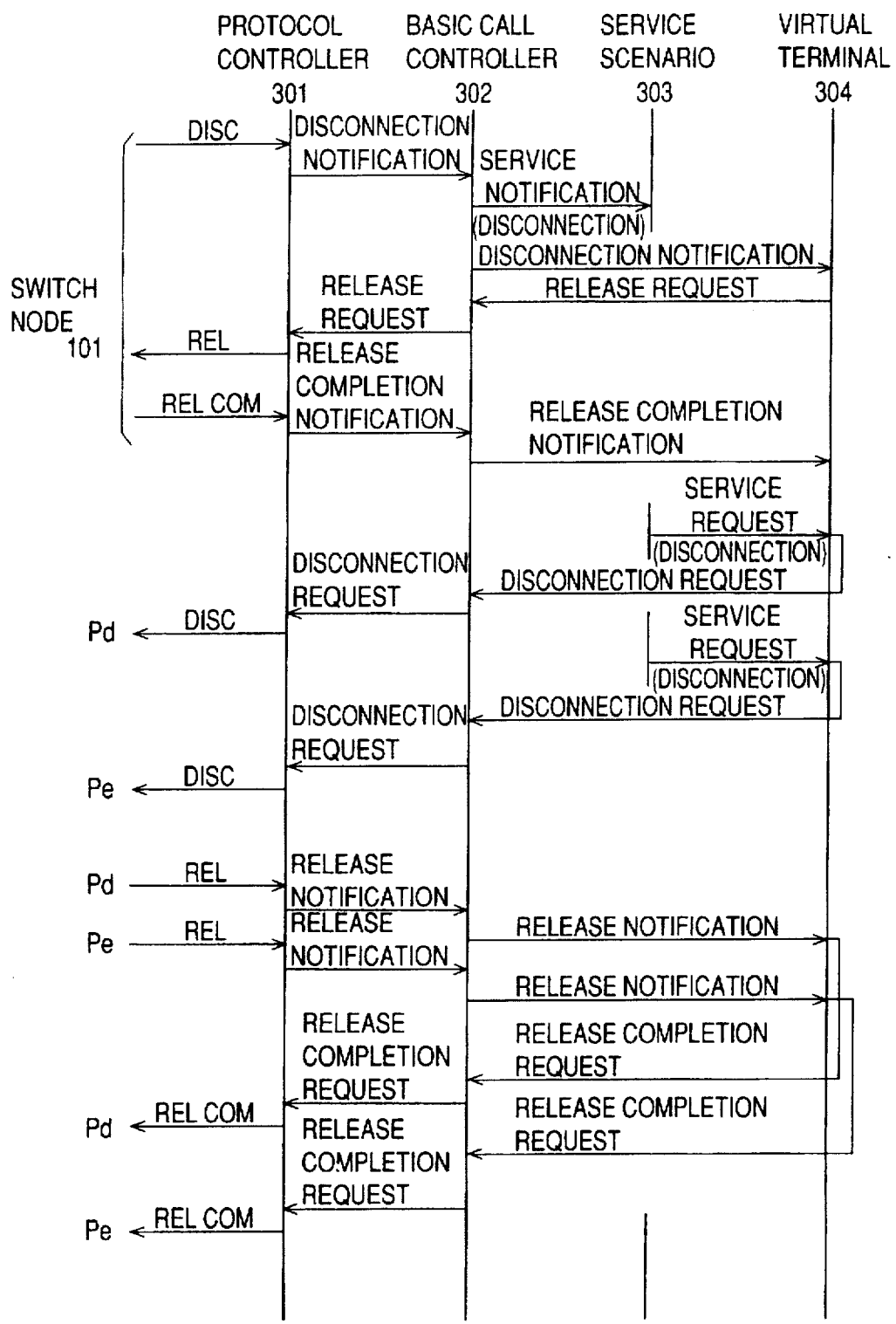
FIG. 17 is a chart showing a sequence of disconnection in the member terminal-side switch node 103 as shown in FIG. 14.

Referring to FIG. 17, upon receipt of the DISC message from the switch node 101, the protocol controller 301 of the switch node 103 sends a "Disconnection Notification" to the basic call controller 302, and the basic call controller 302 sends the "Disconnection Notification" to the virtual terminal 304 and notifies the service scenario 303 through a "Service Notification" that the switch node 101 which is located upstream has disconnected. The virtual terminal 304 sends a "Request for Release" to the protocol controller 301 through the basic call controller 302, and the protocol controller 301 transmits an REL message to the switch node 101. The protocol controller 301 of the switch node 103, receiving an REL COM message from the switch node 101, sends a "Release Completion Notification" to the virtual terminal 304 through the basic call controller 302. The service scenario 303 which has received the service notification realizes that the switch node 101 which is located upstream has terminated the broadcast service and sends a "Request for Service" to the virtual terminal 304 in order to disconnect the broadcast service for the member terminals Pd and Pe. The virtual terminal 304 sends a "Request for Disconnection" to the protocol controller 301 through the basic call controller 302, and the protocol controller 301 transmits a DISC message to each of the member terminals Pd and Pe.

Receiving an REL message from each of the member terminals Pd and Pe, the protocol controller 301 of the switch node 103 sends a "Release Notification" to the virtual terminal 304 through the basic call controller 302. The virtual terminal 304 sends a "Request for Release Completion" to the protocol controller 301 through the basic call controller 302, and the protocol controller 301 transmits an REL COM message to each of the member terminals Pd and Pe. In this way, the broadcast service for all the member terminals is terminated by the broadcasting source 104 requesting the disconnection of the broadcast service.

Needless to say, the above network configuration as shown in FIG. 1 is just an example for explaining an embodiment of the present invention. It is apparent that the present invention is applicable to another switching network including four or more switch nodes each accommodating two or more subscriber terminals.

What is claimed is:

1. A method for establishing a connection for a broadcast service between a source terminal and each of a plurality of destination terminals within a switching network including a plurality of switch nodes each accommodating a plurality of terminals, the method comprising the steps of:

at the source terminal,
  a) generating a set of destination addresses of the destination terminals; and
  b) transmitting the set of destination addresses to a switch node;

at the switch node,
  c) receiving the set of destination addresses from the source terminal;
  d) determining whether the set of destination addresses includes an address of a terminal accommodated by the switch node;
  e) editing the set of destination addresses to produce a first address group and a second address group when the set of destination addresses includes an address of a terminal accommodated by the switch node, the first address group including at least one destination address relating to the switch node, and the second address group including a route group for each destination switch node other than the switch node;
  f) transmitting the route group to the destination switch node; and
  g) establishing a connection for a broadcast service between the source terminal and each of the destination terminals accommodated by the switch node and the destination switch node.

2. The method according to claim 1, further comprising the steps of:

at the source terminal,
  generating an additional destination address of an additional destination terminal after the connection between the source terminal and each of the destination terminals has been set through the switching network; and
  transmitting the additional destination address to the switch node;

at the switch node,
  determining whether the switch node accommodates the additional destination terminal;
  establishing a connection to the additional destination terminal when the switch node accommodates the additional destination terminal;
  transmitting the additional destination address to a destination switch node accommodating the additional destination terminal when the switch node does not accommodate the additional destination terminal; and
  establishing a connection to the additional destination terminal through the destination switch node accommodating the additional destination terminal.

3. The method according to claim 1, further comprising the steps of:

at a first destination terminal,
  generating a disconnection signal after a first connection between the source terminal and the first destination terminal has been established through the switching network; and
  transmitting the disconnection signal to a first destination switch node accommodating the first destination terminal, at the first destination switch node,
disconnecting the first destination terminal when receiving the disconnection signal from the first destination terminal.

4. The method according to claim 3, wherein the first destination switch node transmits a disconnection signal upstream on the first connection to the source terminal to disconnect the first connection when the first destination switch node has disconnected all destination terminals.

5. The method according to claim 1, further comprising the steps of:
at the source terminal,
generating a disconnection signal after the connection between the source terminal and each of the destination terminals has been established through the switching network; and
transmitting the disconnection signal to each of the destination switch nodes through the connection; and
at each of the destination switch nodes,
disconnecting all destination terminals accommodated in the destination switch node when receiving the disconnection signal from the source terminal.

6. A method for setting a path for a broadcast service between a source terminal and each of a plurality of destination terminals through a switching network including a plurality of switch nodes each accommodating a plurality of terminals, the method comprising the steps of:
a) generating a set of destination addresses of the destination terminals at the source terminal; and
b) transmitting a destination address from the source terminal to a destination switch node accommodating a destination terminal having the destination address; and
c) establishing a path for a broadcast service between the source terminal and the destination terminal through the destination switch node,
the step b) comprising, at a switch node receiving the set of destination addresses from the source terminal, the steps of:
b1) deciding whether the set of destination addresses includes an address of a terminal accommodated by the switch node;
b2) editing the set of destination addresses to produce a first address group and a second address group when the set of the destination addresses includes an address of a terminal accommodated by the switch node, the first address group including at least one destination address relating to the switch node, and the second address group including a route group for each destination switch node other than the switch node; and
b3) transmitting the route group to the destination switch node.

7. The method according to claim 6, further comprising the steps of:
at the source terminal,
generating an additional destination address of an additional destination terminal after the path between the source terminal and each of the destination terminals has been set through the switching network; and
transmitting the additional destination address to the switch node;
at the switch node,
determining whether the switch node accommodates the additional destination terminal;
establishing an additional path to the additional destination terminal when the switch node accommodates the additional destination terminal;
transmitting the additional destination address to a destination switch node accommodating the additional destination terminal when the switch node does not accommodate the additional destination terminal; and
establishing an additional path to the additional destination terminal through the destination switch node accommodating the additional destination terminal.

8. The method according to claim 6, further comprising the steps of:
at a first destination terminal,
generating a disconnection signal after a first path between the source terminal and the first destination terminal has been set through the switching network; and
transmitting the disconnection signal to a first destination switch node accommodating the first destination terminal,
at the first destination switch node,
disconnecting the first destination terminal when receiving the disconnection signal from the first destination terminal.

9. The method according to claim 8, wherein the first destination switch node transmits a disconnection signal upstream on the first path to the source terminal to disconnect the first path when the first destination switch node has disconnected all destination terminals.

10. The method according to claim 6, further comprising the steps of:
at the source terminal,
generating a disconnection signal after the path between the source terminal and each of the destination terminals has been set through the switching network; and
transmitting the disconnection signal to each of the destination switch nodes through the path; and
at each of the destination switch node,
disconnecting all destination terminals accommodated in the destination switch node when receiving the disconnection signal from the source terminal.

11. A broadcasting system for broadcasting a service signal to a plurality of destination terminals through a path between a broadcasting source and each of the destination terminals within a switching network including a plurality of switch nodes each accommodating a plurality of terminals,
the broadcasting source comprising:
a generator generating a list of destination addresses of the destination terminals; and
a transmitter transmitting the list of the destination addresses to a switch node;
the switch node, receiving the list of the destination addresses from the broadcasting source, comprising:
a processor determining whether the list of the destination addresses includes an address of a terminal accommodated by the switch node, editing the list of destination addresses to produce a first address group and a second address group when the set of the destination addresses includes an address of a terminal accommodated by the switch node, the first address group including at least one destination address relating to the switch node, and the second address group including a route group for each destination switch node other than the switch node, and transmitting a route group to the destination switch node to set a path for a broadcast service between the broadcasting source and each of the destination terminals accommodated by the switch node and the destination switch node.

12. The broadcasting system according to claim 11, wherein the processor comprises:

a translator deciding whether the list of the destination addresses includes an address of a terminal accommodated by the switch node and determining a route for each destination address;

an editor editing the list of the destination addresses to produce a first address group and a second address group depending on an output of the translator, the first address group including at least one destination address relating to the switch node, and the second address group including a route group for each destination switch node other than the switch node; and a call processor transmitting the route group to the destination switch node to set a path for a broadcast service between the broadcasting source and each of the destination terminals accommodated by the switch node and the destination switch node.

13. A switch node in a broadcasting system which is arranged in a switching network including a plurality of switch nodes each accommodating a plurality of terminals, the broadcasting system broadcasting a service signal to a plurality of destination terminals through a path between a broadcasting source and each of the destination terminals, the switch node comprising:

a receiver receiving a list of the destination addresses from the broadcasting source;

a translator deciding whether the list of the destination addresses includes an address of a terminal accommodated by the switch node and determining a route for each destination address;

an editor editing the list of the destination addresses to produce a first address group and a second address group depending on an output of the translator, the first address group including at least one destination address relating to the switch node, and the second address group including a route group for each destination switch node other than the switch node; and a call processor transmitting the route group to the destination switch node to set a path for a broadcast service between the broadcasting source and each of the destination terminals accommodated by-the switch node and the destination switch node.

* * * * *